United States Patent
Suzuki et al.

(10) Patent No.: US 10,255,665 B2
(45) Date of Patent: Apr. 9, 2019

(54) IMAGE PROCESSING DEVICE AND METHOD, IMAGE CAPTURING DEVICE, PROGRAM, AND RECORD MEDIUM

(71) Applicant: MITSUBISHI ELECTRIC CORPORATION, Tokyo (JP)

(72) Inventors: Daisuke Suzuki, Tokyo (JP); Yoshitaka Toyoda, Tokyo (JP); Takeo Fujita, Tokyo (JP); Narihiro Matoba, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/531,326

(22) PCT Filed: Aug. 6, 2015

(86) PCT No.: PCT/JP2015/072317
§ 371 (c)(1),
(2) Date: May 26, 2017

(87) PCT Pub. No.: WO2016/088406
PCT Pub. Date: Jun. 9, 2016

(65) Prior Publication Data
US 2017/0330311 A1 Nov. 16, 2017

(30) Foreign Application Priority Data
Dec. 4, 2014 (JP) .................................. 2014-245784

(51) Int. Cl.
*H04N 5/232* (2006.01)
*H04N 5/357* (2011.01)
(Continued)

(52) U.S. Cl.
CPC ............ *G06T 5/006* (2013.01); *G06K 9/4604* (2013.01); *G06T 7/11* (2017.01); *G06T 11/60* (2013.01);
(Continued)

(58) Field of Classification Search
CPC ......... G06T 5/006; G06T 3/0093; G06T 3/40; G06T 11/60; G06T 7/11; G06K 9/4604;
(Continued)

(56) References Cited

U.S. PATENT DOCUMENTS

2002/0196472 A1\* 12/2002 Enomoto ................ G06T 5/006
358/3.26
2003/0031375 A1\* 2/2003 Enomoto ................... G06T 5/00
382/255
(Continued)

FOREIGN PATENT DOCUMENTS

| JP | 11-196313 A | 7/1999 |
| JP | 2004-242125 A | 8/2004 |

(Continued)

*Primary Examiner* — Marly S Camargo
(74) *Attorney, Agent, or Firm* — Birch, Stewart, Kolasch & Birch, LLP

(57) ABSTRACT

When distortion correction is performed by dividing a distortion correction target region (Atc), a distortion-corrected division region image (D3) is generated by performing the distortion correction on each division region of the distortion correction target region and a distortion-corrected image (D4) is generated by combining a plurality of distortion-corrected division region images (D3). Regarding each pixel of the distortion-corrected image (D4), a gain (Gp) is determined according to scaling ratios (MR) of a division region including the pixel and one or more division regions around the division region, high-frequency components (D6) of the pixel are multiplied by the gain (Gp), and the product is added to a pixel value of the pixel of the distortion-corrected image (D4). This makes it possible to (Continued)

lessen the difference in the sense of resolution among the division regions of the distortion-corrected image (D4) and obtain an image having an excellent sense of resolution.

13 Claims, 17 Drawing Sheets

(51) Int. Cl.
  *G06T 5/00* (2006.01)
  *G06K 9/46* (2006.01)
  *G06T 7/11* (2017.01)
  *G06T 11/60* (2006.01)
  *G06T 3/00* (2006.01)

(52) U.S. Cl.
  CPC ....... *H04N 5/23238* (2013.01); *H04N 5/3572* (2013.01)

(58) Field of Classification Search
  CPC ...... G06K 9/40; H04N 5/222; H04N 5/23238; H04N 5/3572
  USPC .......... 348/222.1, 223.1, 229.1, 252, 333.09, 348/333.01, 254, 241, 135; 382/300, 264, 382/255, 266, 275, 263, 190, 215, 260, 382/167; 358/3.26, 3.27
  See application file for complete search history.

(56) References Cited

U.S. PATENT DOCUMENTS

| | | | |
|---|---|---|---|
| 2007/0046804 A1 | 3/2007 | Hirano et al. | |
| 2007/0115384 A1* | 5/2007 | Furukawa | ............. G06T 3/0018 348/335 |
| 2008/0137980 A1 | 6/2008 | Mizuno | |
| 2009/0231472 A1* | 9/2009 | Kasahara | ................ G06T 5/006 348/241 |
| 2009/0238455 A1* | 9/2009 | Kasahara | ............. H04N 5/3572 382/167 |
| 2011/0254947 A1 | 10/2011 | Kasahara | |

FOREIGN PATENT DOCUMENTS

| | | |
|---|---|---|
| JP | 2005-86279 A | 3/2005 |
| JP | 2007-96588 A | 4/2007 |
| JP | 2008-146155 A | 6/2008 |
| JP | 2010-154050 A | 7/2010 |
| JP | 2010-213175 A | 9/2010 |

* cited by examiner

| Rb(1,1) | Rb(2,1) | Rb(3,1) | Rb(4,1) | Rb(5,1) | Rb(6,1) |
|---|---|---|---|---|---|
| Rb(1,2) | Rb(2,2) | Rb(3,2) | Rb(4,2) | Rb(5,2) | Rb(6,2) |
| Rb(1,3) | Rb(2,3) | Rb(3,3) | Rb(4,3) | Rb(5,3) | Rb(6,3) |
| Rb(1,4) | Rb(2,4) | Rb(3,4) | Rb(4,4) | Rb(5,4) | Rb(6,4) |
| Rb(1,5) | Rb(2,5) | Rb(3,5) | Rb(4,5) | Rb(5,5) | Rb(6,5) |
| Rb(1,6) | Rb(2,6) | Rb(3,6) | Rb(4,6) | Rb(5,6) | Rb(6,6) |

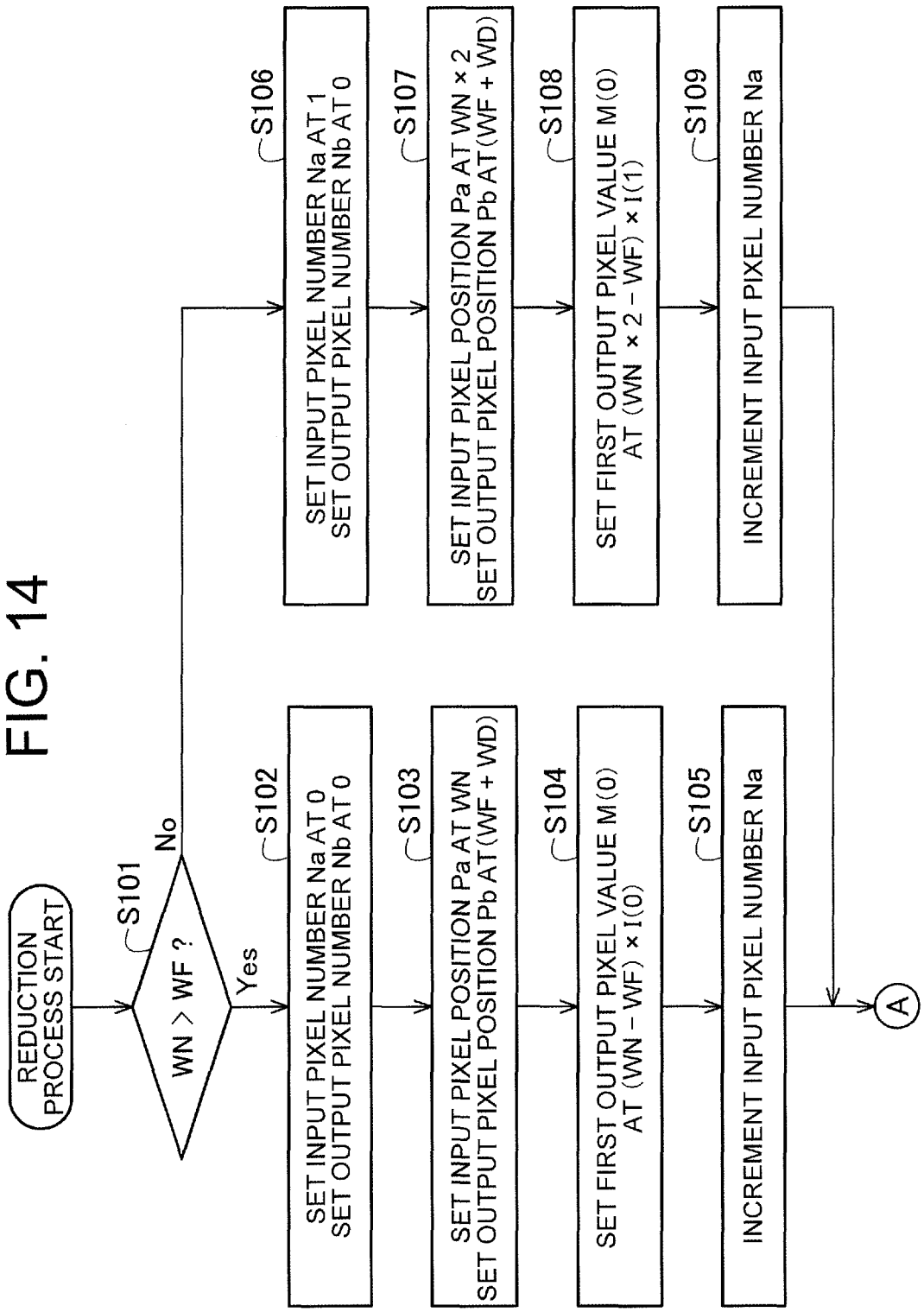

FIG. 17

| | PROCESSING | Na | Nb | Pa | Pb | M(Nb) | JUDGMENT RESULT |
|---|---|---|---|---|---|---|---|
| S101 | WN > WF ? | | | | | | No |
| S102 | Na ← 0<br>Nb ← 0 | 0 | 0 | - | - | - | |
| S103 | Pa ← WN<br>Pb ← WF + WD | 0 | 0 | WN | WF + WD | | |
| S104 | M(0) ←<br>(WN − WF) * I(0) | 0 | 0 | WN | WF + WD | M(0) =<br>(WN − WF) * I(0) | |
| S105 | Na ← Na + 1 | 1 | 0 | WN | WF + WD | M(0) =<br>(WN − WF) * I(0) | |
| S111 | Pa + WN ≧ Pb ? | 1 | 0 | WN | WF + WD | M(0) =<br>(WN − WF) * I(0) | No |
| S121 | Pa ← Pa + WN | 1 | 0 | WN + WN<br>= WN * 2 | WF + WD | M(0) =<br>(WN − WF) * I(0) | |
| S122 | M(Nb) ←<br>M(Nb) + WN * I(Na) | 1 | 0 | WN * 2 | WF + WD | M(0) =<br>(WN − WF) * I(0)<br>+ WN * I(1) | |
| S123 | Na ← Na + 1 | 2 | 0 | | | | |
| S111 | Pa + WN ≧ Pb ? | 2 | 0 | WN * 2 | WF + WD | M(0) =<br>(WN − WF) * I(0)<br>+ WN * I(1) | Yes |
| S112 | M(Nb) ←<br>M(Nb) + (Pb − Pa)<br>* I(Na) | 2 | 0 | WN * 2 | WF + WD | M(0) =<br>(WN − WF) * I(0)<br>+ WN * I(1)<br>+ (WF + WD −<br>WN * 2) | |
| S113 | OUTPUT<br>Int{M(Nb)/WD} | 2 | 0 | WN * 2 | WF + WD | OUTPUT<br>Int{M(0)/WD} | |
| S114 | Nb ← Nb + 1 | 2 | 1 | WN * 2 | WF + WD | - | |
| S115 | Nb = NOP ? | 2 | 1 | WN * 2 | WF + WD | - | No |
| S116 | Pa ← Pa + WN | 2 | 1 | WN * 2<br>+ WN<br>= WN * 3 | WF + WD | - | |
| S117 | M(Nb) ←<br>(Pa − Pb) * I(Na) | 2 | 1 | WN * 3 | WF + WD | M(1) ←<br>(WN * 3 −<br>WF + WD ) * I(2) | |
| S118 | Pb ← Pb + WD | 2 | 1 | WN * 3 | WF + WD + WD<br>= WF + WD * 2 | | |
| S119 | Na ← Na + 1 | 3 | 1 | WN * 3 | | | | derstood as local scaling (magnification or reduction) of the correction target region. Therefore, in cases where the images of the division regions after the distortion correction have sizes equal to each other and the sizes of the division regions before the distortion correction differ from each other, for example, this means that scaling with scaling ratios varying from division region to division region has been carried out, and the image quality has the sense of resolution varying from division region to division region. In such cases, if the distortion correction target region is divided into division regions and the distortion correction process is performed for each division region by using the conventional technology described above, the sense of resolution varies from division region to division region and continuity of the sense of resolution cannot be achieved especially at boundaries between division regions.

IMAGE PROCESSING DEVICE AND METHOD, IMAGE CAPTURING DEVICE, PROGRAM, AND RECORD MEDIUM

TECHNICAL FIELD

The present invention relates to an image processing device and method for correcting distortion of an image captured by using a lens having optical distortion, and to an image capturing device employing the image processing device. The present invention relates also to a program for causing a computer to execute the image processing and to a computer-readable record medium storing the program.

BACKGROUND ART

Conventionally, surveillance cameras, in-vehicle cameras and the like employ an image processing device for capturing a wide-range image by using a wide-angle lens such as a fisheye lens, correcting image distortion due to the optical distortion of the lens by means of image processing, and outputting the corrected image.

Such an image processing device corrects the image distortion by determining a position in the image before the correction corresponding to a position of a pixel in the corrected image by means of coordinate transformation and interpolating a pixel value at the determined position by using vicinal pixel values. In such processing, a line buffer or the like accessible at high speed is used to make it possible to refer to the vicinal pixel values without processing delay.

When the image distortion is corrected by means of the aforementioned coordinate transformation, the amount of correction is relatively great in the peripheral part of the image as compared to the center of the image. Accordingly, in the corrected image, resolution performance decreases as it goes from the center towards the peripheral part.

In this connection, there has been proposed a technology of compensating for decrease in a sense of resolution caused by the image distortion correction by using edge enhancement processing and setting an enhancement coefficient so that an edge enhancement level increases with increase in the optical image distortion (see Patent Reference 1).

PRIOR ART REFERENCE

Patent Reference

Patent Reference 1: Japanese Patent Application Publication No. 2004-242125 (Paragraph Nos. 0053 to 0065, FIGS. 4 to 6)

SUMMARY OF THE INVENTION

Problem to be Solved by the Invention

Incidentally, for the purpose of reducing the capacity of the line buffer or the like, there are cases where an image processing device for correcting the distortion of a distorted image having a large number of pixels is configured to divide an image region as the target of the distortion correction, correct the image distortion of each division region obtained by the division, combine the images after the distortion correction, and thereby generate a distortion-corrected image of the whole of the distortion correction target region. In such cases, image quality of the output image can be affected by a difference in size between the images of each division region before and after the distortion correction rather than by the amount of the optical image distortion.

The distortion correction can be understood as local scaling (magnification or reduction) of the correction target region. Therefore, in cases where the images of the division regions after the distortion correction have sizes equal to each other and the sizes of the division regions before the distortion correction differ from each other, for example, this means that scaling with scaling ratios varying from division region to division region has been carried out, and the image quality has the sense of resolution varying from division region to division region. In such cases, if the distortion correction target region is divided into division regions and the distortion correction process is performed for each division region by using the conventional technology described above, the sense of resolution varies from division region to division region and continuity of the sense of resolution cannot be achieved especially at boundaries between division regions.

An object of the present invention, which has been made to resolve the above-described problem, is to make it possible to achieve a continuous sense of resolution at boundaries between division regions in cases where the distortion-corrected image of the distortion correction target region is generated by dividing the distortion correction target region in an input image into division regions, performing the distortion correction for each division region, and combining the distortion-corrected images of the division regions.

Means for Solving the Problem

An image processing device according to the present invention includes:

a reference image generation means that successively extracts a plurality of partial region images, each including a division region constituting a part of a distortion correction target region, from an input image, and successively outputs the plurality of partial region images or a plurality of images obtained by reducing the plurality of partial region images as reference images each including an image of the division region or a reduced division region corresponding to the division region;

a distortion correction means that performs distortion correction on the image of the division region or the reduced division region included in each of the reference images, and successively outputs a plurality of distortion-corrected division region images;

an image combination means that generates a distortion-corrected image of the distortion correction target region by combining the plurality of distortion-corrected division region images;

a high-frequency-component image generation means that generates a high-frequency component image of the distortion-corrected image;

a scaling ratio calculation means that calculates a division region scaling ratio regarding each of the plurality of distortion-corrected division region images from a size of the distortion-corrected division region image and a size of the division region or the reduced division region in the reference image corresponding to the distortion-corrected division region image;

a pixel specification means that successively specifies a plurality of pixels forming the distortion-corrected image as attention pixels;

a pixel gain calculation means that calculates a pixel gain regarding the attention pixel from the division region scaling ratio regarding the distortion-corrected division region image including a pixel corresponding to the attention pixel of the distortion-corrected image and the division region scaling ratios regarding one or more distortion-corrected division region images adjoining the distortion-corrected division region image;

an adjustment means that multiplies a pixel value of a pixel of the high-frequency component image corresponding to the attention pixel by the pixel gain of the attention pixel, and thereby outputs a pixel value of a pixel of an adjusted high-frequency component image corresponding to the attention pixel; and an addition means that outputs a result of addition of a pixel value of the attention pixel of the distortion-corrected image and the pixel value of the pixel of the adjusted high-frequency component image corresponding to the attention pixel as a pixel value of a pixel of a distortion-corrected image of the distortion correction target region corresponding to the attention pixel.

Effects of the Invention

According to the present invention, it is possible to lessen the unevenness or discontinuity of the sense of resolution caused by performing a distortion correction process for each division region and combining distortion-corrected division region images and by the difference in the scaling ratio among the division regions in the distortion correction process.

BRIEF DESCRIPTION OF THE DRAWINGS

FIG. 14 is a flowchart showing the flow of a process for calculating pixel values of a reduced image by the image reduction means.

FIG. 17 is a diagram showing changes in variables accompanying the progress of the process of FIGS. 14 to 16 in a case of pixel arrangement shown in FIG. 13(A).

MODE FOR CARRYING OUT THE INVENTION

First Embodiment

Figure 1:
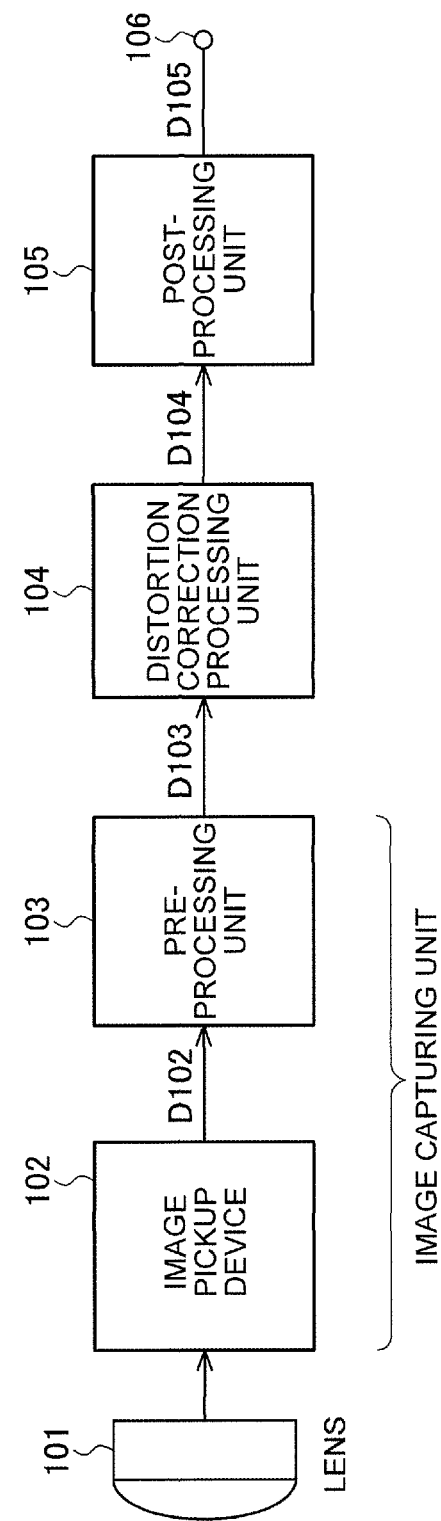
FIG. 1 is a block diagram showing an image capturing device according to the present invention.

FIG. 1 is a diagram showing a configuration of an image capturing device according to a first embodiment of the present invention.

The illustrated image capturing device includes a lens 101, an image pickup device 102, a preprocessing unit 103, a distortion correction processing unit 104, a post-processing unit 105, and an image signal output terminal 106.

The lens 101 is a lens having optical distortion, such as a wide-angle lens, such as a fisheye lens capable of capturing an image covering a hemispherical space.

The image pickup device 102, made of a CCD or CMOS image sensor, converts an optical image formed by the lens 101 into an electric signal and outputs an analog image signal D102 representing a captured image.

The preprocessing unit 103 performs a CDS (Correlated Double Sampling) process, a gain process, an A/D conversion process and so on, on the analog image signal D102 from the image pickup device 102 and outputs a digital image signal D103 representing a captured image.

The image pickup device 102 and the preprocessing unit 103 constitute an image capturing unit that captures an image of a subject by receiving light from the subject, and outputs the digital image signal D103 representing the captured image.

The distortion correction processing unit 104 performs a distortion correction process on an image of a distortion correction target region constituting a part of the captured image represented by the digital image signal D103 supplied from the preprocessing unit 103, while emphasizing high-frequency components as will be explained later.

The post-processing unit 105 performs processing such as YCbCr conversion, color matrix conversion and gradation conversion appropriate for an output device (display device, etc.) on an image obtained by performing the distortion correction by the distortion correction processing unit 104 and outputs an image signal D105, which is suitable as an output, from the image signal output terminal 106.

Figure 2:
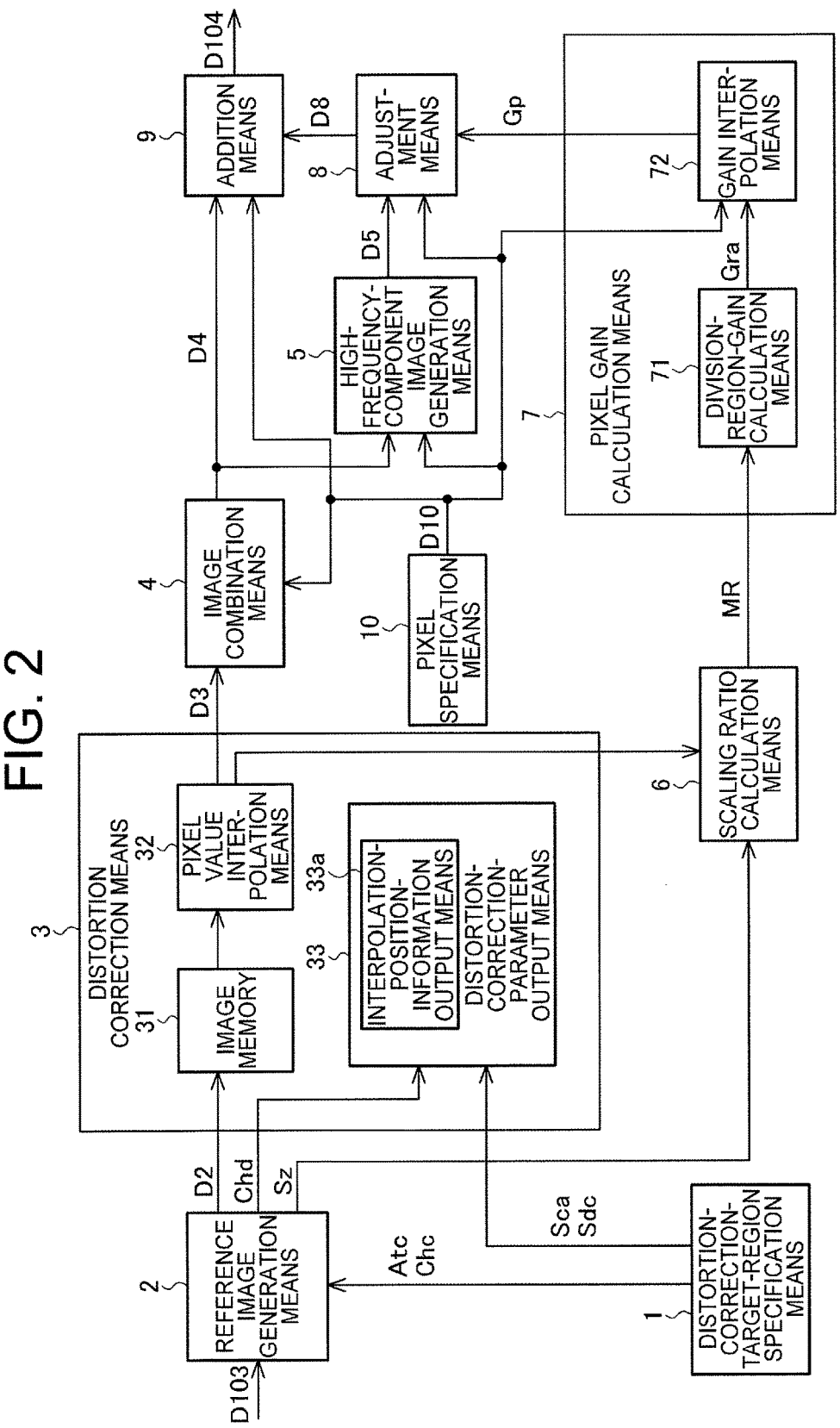
FIG. 2 is a diagram showing an image processing device according to a first embodiment of the present invention.

FIG. 2 shows an image processing device according to this embodiment that can be employed as an example of the distortion correction processing unit 104.

The image processing device shown in FIG. 2 includes a distortion-correction-target-region specification means 1, a reference image generation means 2, a distortion correction means 3, an image combination means 4, a high-frequency-component image generation means 5, a scaling ratio calculation means 6, a pixel gain calculation means 7, an adjustment means 8, an addition means 9, and a pixel specification means 10.

The distortion-correction-target-region specification means 1 supplies information indicating the distortion correction target region Atc in the captured image represented by the digital image signal D103 outputted from the preprocessing unit 103, to the reference image generation means 2.

Figures 3A, 3B:
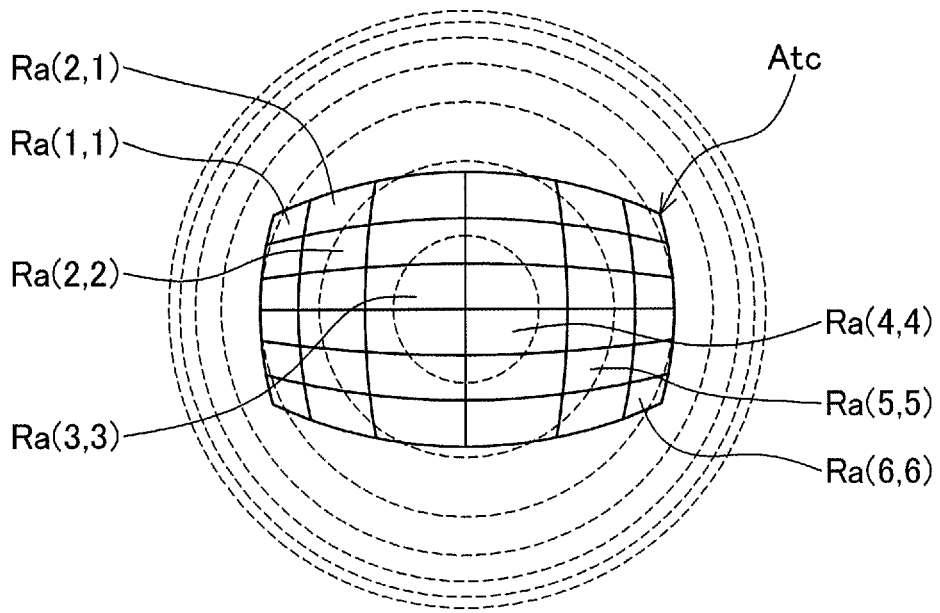
FIGS. 3(A) and 3(B) are diagrams showing an example of an image of a distortion correction target region and a corresponding image after distortion correction.
Figures 4A, 4B:
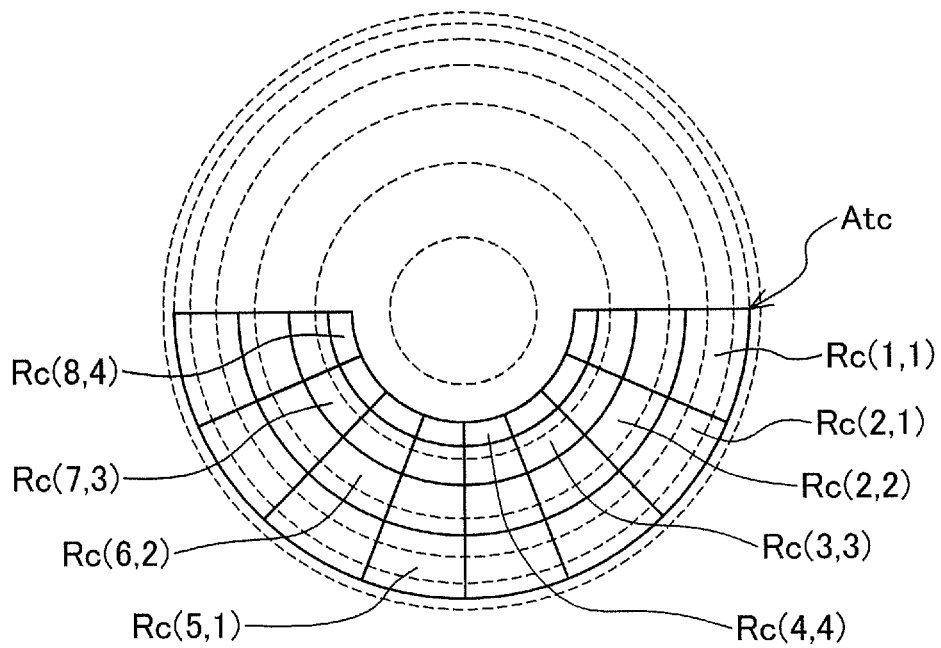
FIGS. 4(A) and 4(B) are diagrams showing another example of an image of a distortion correction target region and a corresponding image after the distortion correction.

Different examples of the distortion correction target region Atc are shown in FIG. 3(A) and FIG. 4(A).

The example of FIG. 3(A) assumes a case where a region centered on a particular direction such as an optical axis direction is extracted from an image captured with the fisheye lens and the image distortion is corrected, and in the example, the region centered on the optical axis direction becomes the distortion correction target region Atc.

The example of FIG. 4(A) assumes a case where an arc-shaped region centered on a particular direction such as the optical axis direction is extracted from the image captured with the fisheye lens and a so-called panoramic image captured over a wide range in a horizontal direction is generated, and in the example, the arc-shaped region centered on the optical axis direction becomes the distortion correction target region Atc.

In the following description, the captured image represented by the digital image signal D103 is indicated by the same reference character "D103".

The reference image generation means 2 forms division regions Ra(1, 1), Ra(2, 1), . . . , Ra(6, 6) by dividing the distortion correction target region Atc shown in FIG. 3(A) as indicated by solid lines, or forms division regions Rc(1, 1), Rc(2, 1), . . . , Rc(8, 4) by dividing the distortion correction target region Atc shown in FIG. 4(A) as indicated by solid lines. Incidentally, reference characters are shown only for some of the division regions and omitted for the other division regions to avoid complicating the drawings.

The reference image generation means 2 successively extracts an image of a region including each of the division regions and its vicinal region, such as a rectangular region, from the captured image D103 and successively supplies the extracted image to the distortion correction means 3 as a reference image D2.

The distortion correction means 3 generates a distortion-corrected division region image D3 by performing distortion correction on the division region included in each reference image D2 and supplies the generated distortion-corrected division region image D3 to the image combination means 4. This process is performed successively for a plurality of reference images D2 successively supplied from the reference image generation means 2. Consequently, a plurality of distortion-corrected division region images D3 are outputted successively.

For example, the process is performed successively for a plurality of reference images D2 including images of the division regions Ra(1, 1)-Ra(6, 6) shown in FIG. 3(A), and images of regions Rb(1, 1)-Rb(6, 6) shown in FIG. 3(B) are generated as the distortion-corrected division region images D3. Alternatively, the process is performed successively for a plurality of reference images D2 including images of the division regions Rc(1, 1)-Rc(8, 4) shown in FIG. 4(A), and images of regions Rd(1, 1)-Rd(8, 4) shown in FIG. 4(B) are generated as the distortion-corrected division region images D3.

The images of the regions shown in FIG. 3(B) or FIG. 4(B) are images of rectangular regions having the same size and being arranged in the vertical direction and the horizontal direction.

Here, the "rectangular region" means a region having a pair of sides extending in the horizontal direction and the other pair of sides extending in the vertical direction. The same goes for other "rectangular regions" in the present application.

The image combination means 4 generates a distortion-corrected image D4 of the distortion correction target region Atc by combining the plurality of distortion-corrected division region images D3 successively outputted from the distortion correction means 3 and supplies the generated distortion-corrected image D4 to the high-frequency-component image generation means 5 and the addition means 9. In the example of FIG. 3(B), the distortion-corrected image D4 is made up of the images of the regions Rb(1, 1)-Rb(6, 6). In the example of FIG. 4(B), the distortion-corrected image D4 is made up of the images of the regions Rd(1, 1)-Rd(8, 4).

The position of the distortion-corrected division region image D3 in the distortion-corrected image D4 is represented by coordinates (s, t), and the distortion-corrected division region image at the position is represented by a reference character D3(s, t). Incidentally, s represents one of 1 to S, and t represents one of 1 to T. Here, S is a maximum value of s, and T is a maximum value of t. In the example of FIG. 3(B), each of Rb(1, 1)-Rb(6, 6) corresponds to D3(s, t) and S and T are both 6. In the example of FIG. 4(B), each of Rd(1, 1)-Rd(8, 4) corresponds to D3(s, t) and S is 8 and T is 4.

Further, the reference image corresponding to the distortion-corrected division region image D3(s, t) is represented by a reference character D2(s, t). Incidentally, the distortion-corrected division region image is simply represented by the reference character D3 when it is unnecessary to emphasize which one of the plurality of distortion-corrected division region images the distortion-corrected division region image is. Similarly, the reference image is simply represented by the reference character D2 when it is unnecessary to emphasize which one of the plurality of reference images the reference image is.

The position of each pixel in the distortion-corrected image D4 is represented by coordinates (p, q), and the pixel at the position and its pixel value is represented by D4(p, q).

While the plurality of distortion-corrected division region images D3(s, t) are combined to make the distortion-corrected image D4, a pixel of the distortion-corrected division region image D3(s, t) corresponding to the pixel D4(p, q) of the distortion-corrected image D4 is assumed to be situated at a position represented by the same coordinate values (p, q) and is represented by a reference character PD3(p, q), and a pixel value of the pixel is also represented by the same reference character PD3(p, q).

The high-frequency-component image generation means 5 generates a high-frequency component image D5 by extracting the high-frequency components from the distortion-corrected image D4 and supplies the generated high-frequency component image D5 to the adjustment means 8. The extraction of the high-frequency components is possible by performing a high-pass filter process in regard to the horizontal direction and the vertical direction, for example. Instead, it is also possible to perform a super-resolution process for improving the sense of resolution or the like. In the high-frequency component image D5, a pixel corresponding to the pixel D4($p$, $q$) (i.e., a pixel at the corresponding position) of the distortion-corrected image D4 and its pixel value are represented by a reference character D5($p$, $q$).

The scaling ratio calculation means 6 calculates a division region scaling ratio MR(s, t) regarding each of the distortion-corrected division region images D3($s$, $t$) on the basis of a size of the distortion-corrected division region image D3($s$, $t$) and a size of the division region in the reference image D2 corresponding to the distortion-corrected division region image D3($s$, $t$), and supplies the calculated division region scaling ratio MR(s, t) to the pixel gain calculation means 7.

Incidentally, in the present application, the "size" regarding an image or image region is represented by the number of pixels included in the image or region, or the number of pixels of the image or region in a certain direction such as the horizontal direction or the vertical direction.

The pixel gain calculation means 7 calculates a gain (pixel gain) Gp(p, q) regarding each pixel D4($p$, $q$) of the distortion-corrected image D4 on the basis of the division region scaling ratio MR(s, t) calculated by the scaling ratio calculation means 6 for each of the plurality of distortion-corrected division region images D3($s$, $t$) and outputs the calculated pixel gain Gp(p, q) to the adjustment means 8.

The adjustment means 8 generates an adjusted high-frequency component image D8 by multiplying the high-frequency component image D5 and the pixel gain Gp together, and supplies the adjusted high-frequency component image D8 to the addition means 9. This process is performed for each pixel. Specifically, the adjustment means 8 multiplies the gain Gp(p, q) regarding each pixel D4($p$, $q$) of the distortion-corrected image D4 and the pixel value D5($p$, $q$) of the corresponding pixel of the high-frequency component image D5 together, thereby generates a pixel value D8($p$, $q$) of the corresponding pixel of the adjusted high-frequency component image D8, and supplies the generated pixel value D8($p$, $q$) to the addition means 9.

The addition means 9 adds the distortion-corrected image D4 and the adjusted high-frequency component image D8 together, and outputs the result of the addition as a final distortion-corrected image D104. This process is also performed for each pixel. Specifically, the addition means 9 adds the pixel value D4($p$, $q$) of each pixel of the distortion-corrected image D4 and the pixel value D8($p$, $q$) of the corresponding pixel of the adjusted high-frequency component image D8 together, and outputs the result of the addition as a pixel value D104($p$, $q$) of the corresponding pixel of the final distortion-corrected image D104.

The pixel specification means 10 successively specifies pixels D4($p$, $q$) in the distortion-corrected image D4 as attention pixels and notifies the image combination means 4, the high-frequency-component image generation means 5, the pixel gain calculation means 7, the adjustment means 8 and the addition means 9 of information D10 indicating positions (p, q) of the specified attention pixels. The image combination means 4, the high-frequency-component image generation means 5, the pixel gain calculation means 7, the adjustment means 8 and the addition means 9 perform the processes for the corresponding pixel according to the specification of the position of the attention pixel by the pixel specification means 10.

Specifically, the image combination means 4 outputs the pixel value D4($p$, $q$) of the specified pixel of the distortion-corrected image D4. The high-frequency-component image generation means 5 outputs the pixel value D5($p$, $q$) of the specified pixel of the high-frequency component image D5. The pixel gain calculation means 7 calculates and outputs the pixel gain Gp(p, q) regarding the specified pixel D4($p$, $q$). The adjustment means 8 multiplies the pixel value D5($p$, $q$) of the specified pixel outputted from the high-frequency-component image generation means 5 by the pixel gain Gp(p, q) regarding the specified pixel outputted from the pixel gain calculation means 7 and outputs the result of the multiplication. The addition means 9 adds the pixel value D4($p$, $q$) regarding the specified pixel outputted from the image combination means 4 and the pixel value D8($p$, $q$) outputted from the adjustment means 8 together, and thereby outputs the result of the addition as the pixel value D104($p$, $q$) regarding the specified pixel.

In the following, the operation of the distortion-correction-target-region specification means 1, the reference image generation means 2, the distortion correction means 3, the scaling ratio calculation means 6 and the pixel gain calculation means 7 will be described in more detail.

The distortion-correction-target-region specification means 1 not only supplies information indicating the distortion correction target region Atc in the captured image D103 to the reference image generation means 2 as above but also supplies information indicating an optical distortion characteristic Chc of the distortion correction target region Atc to the reference image generation means 2. The information indicating the distortion characteristic Chc is represented by the same reference character "Chc".

The distortion-correction-target-region specification means 1 also determines a size of the distortion-corrected image D104 on the basis of specification from a user or restriction on a size of the output image of the image capturing device and supplies information indicating the determined size Sca to the distortion correction means 3. The information indicating the size Sca is represented by the same reference character "Sca".

The distortion-correction-target-region specification means 1 also determines a distortion correction processing mode Sdc and supplies information indicating the determined distortion correction processing mode Sdc to the distortion correction means 3.

Figure 5:
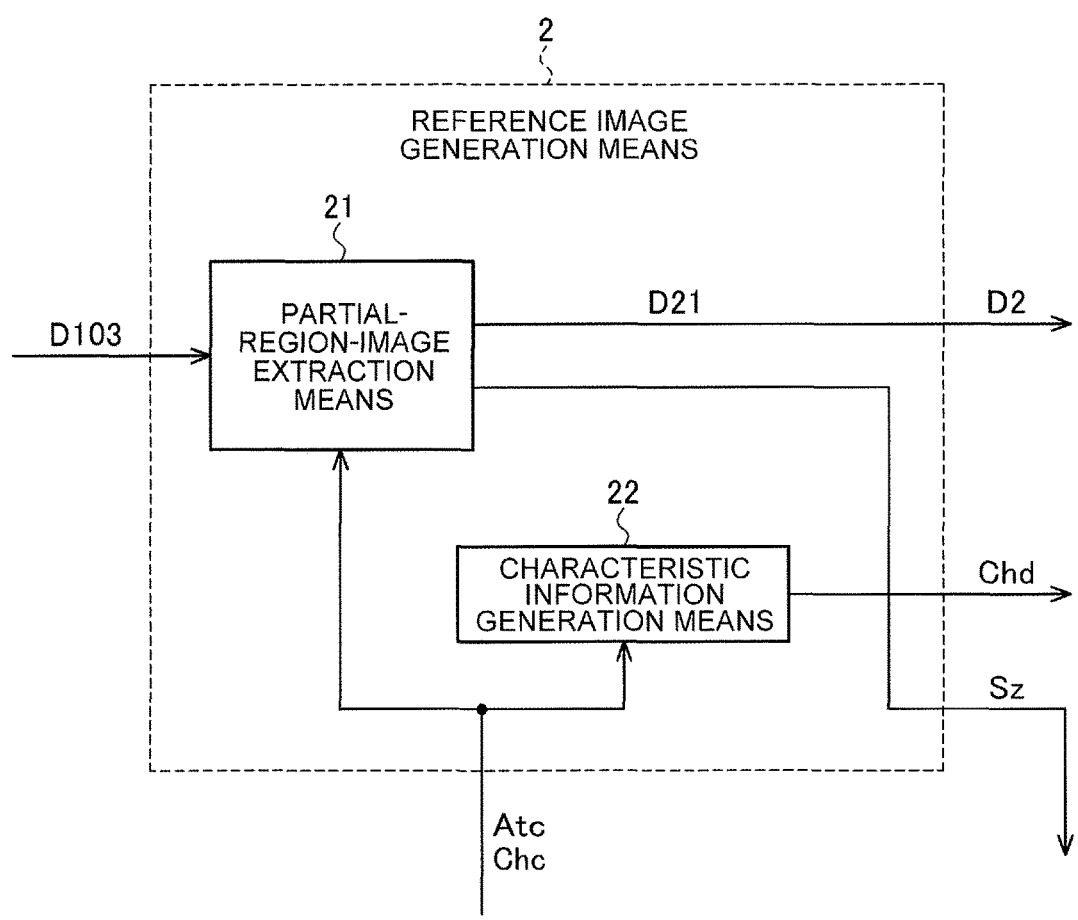
FIG. 5 is a block diagram showing an example of a configuration of a reference image generation means used in the first embodiment.

As shown in FIG. 5, the reference image generation means 2 includes a partial-region-image extraction means 21 and a characteristic information generation means 22.

Figures 6A, 6B:
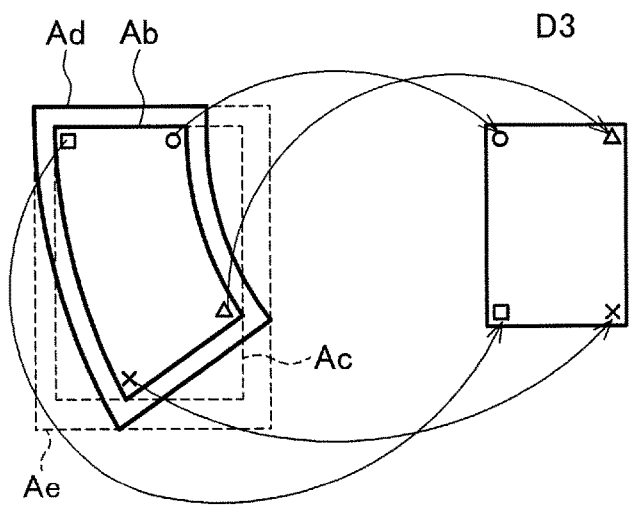
FIGS. 6(A) and 6(B) are diagrams showing a relationship among a division region, a rectangular region circumscribing the division region, a region in the vicinity of the division region, a rectangular region including the division region and its vicinal region, and a distortion-corrected division region image.

The partial-region-image extraction means 21 forms the division regions Ra(1, 1)-Ra(6, 6) or Rc(1, 1)-Rc(8, 4) by dividing the distortion correction target region Atc as shown in FIG. 3(A) or FIG. 4(A), for example. One of the division regions, namely, the division region Rc(8, 4) in FIG. 4(A) is indicated by a reference character Ab in FIG. 6(A). FIG. 6(B) shows the distortion-corrected division region image D3 corresponding to the division region Ab. In FIG. 6(A) and FIG. 6(B), a white circle mark "○", a white triangle mark "Δ", a white square mark "□" and a cross mark "x" at the four corners of each of the region Ab and the image D3, and arrowed lines connecting these marks indicate a correspondence relationship between positions in the image before the distortion correction and positions in the image after the distortion correction.

Incidentally, in the example of FIG. 3(B), shapes and sizes of the division regions Ra(1, 1)-Ra(6, 6) in FIG. 3(A) are determined so that the rectangular regions Rb(1, 1)-Rb(6, 6) in the distortion-corrected image become equivalent to each other. Similarly, in the example of FIG. 4(B), shapes and sizes of the division regions Rc(1, 1)-Rc(8, 4) in FIG. 4(A)

are determined so that the rectangular regions Rd(1, 1)-Rd(8, 4) in the distortion-corrected image become equivalent to each other. However, this condition is not essential; it is also possible to divide the distortion correction target region Atc so that the rectangular regions in the distortion-corrected image include rectangular regions differing from each other in the shape (ratio between lengths of sides) or the size.

The generation of the distortion-corrected division region image D3 (the image of one of the regions Rb(1, 1)-Rb(6, 6) in FIG. 3(B) or one of the regions Rd(1, 1)-Rd(8, 4) in FIG. 4(B)) by the distortion correction means 3 requires information on positions and pixel values of not only pixels of the corresponding division region (one of the regions Ra(1, 1)-Ra(6, 6) in FIG. 3(A) or one of the regions Rc(1, 1)-Rc(8, 4) in FIG. 4(A)) but also pixels in its vicinal region, in the captured image D103 before the distortion correction.

In FIG. 6(A), the region in the vicinity of the division region Ab is indicated by a reference character Ad.

The partial-region-image extraction means 21 of the reference image generation means 2 extracts, from the captured image D103, the image of the rectangular region including the division region Ab and its vicinal region Ad, such as a rectangular region Ae circumscribing a region formed of the division region Ab and its vicinal region Ad and outputs the extracted image as a partial region image D21.

The rectangular region Ae circumscribing the region formed of the division region Ab and its vicinal region Ad means a rectangular region which includes the whole of the region formed of the division region Ab and its vicinal region Ad and has a minimum dimension in both the horizontal direction and the vertical direction.

Since the partial region image D21 is a rectangular region including the division region Ab and its vicinal region Ad as mentioned above, partial region images D21 corresponding to distortion-corrected division regions adjoining each other (e.g., the region Rd(1, 1) and the region Rd(2, 1) in FIG. 4(B)) overlap each other.

The partial-region-image extraction means 21 successively generates the partial region images D21(s, t) respectively corresponding to the distortion-corrected division region images D3(s, t). The reference image generation means 2 successively supplies the partial region images D21(s, t), as the reference images D2(s, t), to the distortion correction means 3.

The characteristic information generation means 22 of the reference image generation means 2 generates information indicating a distortion correction characteristic Chd of each reference image D2(s, t), specifically, the division region Ab and its vicinal region Ad in the reference image D2(s, t), from the information indicating the optical distortion characteristic Chc supplied from the distortion-correction-target-region specification means 1. The reference image generation means 2 supplies each reference image D2(s, t) and the information indicating the distortion correction characteristic Chd of the reference image D2(s, t) to the distortion correction means 3.

The partial-region-image extraction means 21 of the reference image generation means 2 also generates information indicating the size Sz of the division region Ab in each reference image D2 (FIG. 6(A)) and supplies the generated information to the scaling ratio calculation means 6.

For example, a size of a rectangular region Ac circumscribing the division region Ab is used as the size Sz of the division region Ab.

The rectangular region Ac circumscribing the division region Ab means a rectangular region which includes the whole of the division region Ab and has a minimum dimension in both the horizontal direction and the vertical direction.

In the dividing of the distortion correction target region Atc, the reference image generation means 2 determines the size of the division region Ab so that the volume of data of the reference image D2 supplied to the distortion correction means 3 at a time does not become excessive, that is, so that the correction process can be performed at a time. In this determination, the reference image generation means 2 calculates a size of an image before the distortion correction, for which the correction process can be performed at a time by the distortion correction means 3, by considering also the optical distortion characteristic Chc of the captured image D103 and determines the size of the division region Ab on the basis of the result of the calculation.

The distortion correction means 3 performs the distortion correction on the image of the division region Ab in each reference image D2(s, t) supplied from the reference image generation means 2 and thereby generates a corresponding distortion-corrected division region image D3(s, t). In this distortion correction, pixels in the division region Ab and its vicinal region Ad are used.

In the determination of the size of the distortion-corrected division region image D3, the distortion correction means 3 refers to the information Sca indicating the size of the distortion-corrected image D104. In other words, the size of each distortion-corrected division region image D3 is determined on the basis of the size Sca.

The distortion correction means 3 includes an image memory 31, a pixel value interpolation means 32 and a distortion-correction-parameter output means 33.

Figures 7A, 7B, 7C:
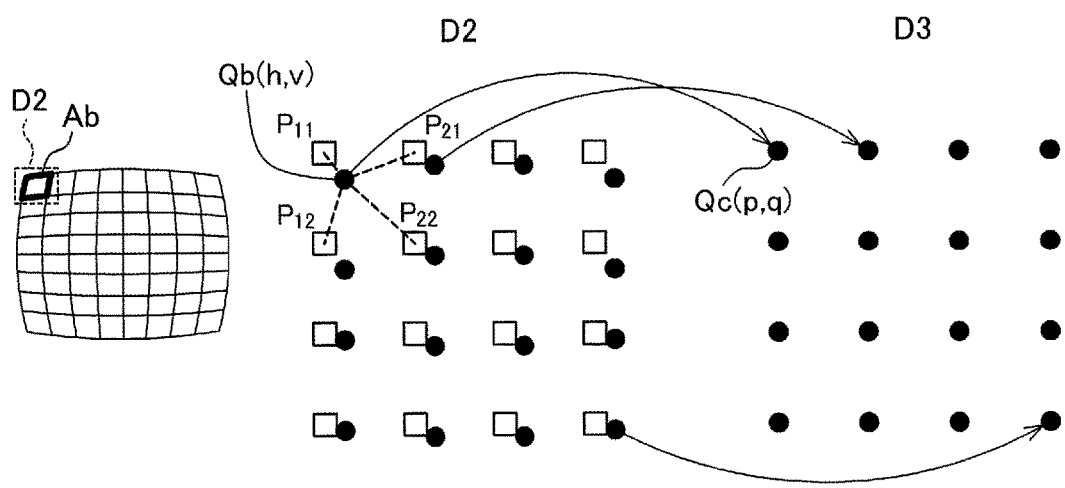
FIGS. 7(A) to 7(C) are diagrams schematically showing a method of generating the distortion-corrected division region image employed by a distortion correction means.

FIGS. 7(A) to 7(C) are diagrams schematically showing an example of the generation of the distortion-corrected division region image D3 by the distortion correction means 3, specifically, coordinate transformation in the generation of the distortion-corrected division region image D3.

In FIGS. 7(A) to 7(C), a case where the captured image D103 is shot with a lens having a barrel-shaped distortion is assumed. Further, a case where a reference image D2 including a division region Ab constituting a part (indicated by thick lines) of the distortion correction target region Atc shown in FIG. 7(A) is inputted from the reference image generation means 2 to the distortion correction means 3 is assumed as an example.

In FIG. 7(C), the position of each pixel in the distortion-corrected division region image D3 is indicated by a black circle mark "●". In FIG. 7(B), a position in the reference image D2 (interpolation position) corresponding to the position of each pixel of the distortion-corrected division region image D3 (black circle mark in FIG. 7(C)) is indicated by the black circle mark, while the position of each pixel of the reference image D2 is indicated by a white square mark "□".

To generate the distortion-corrected division region image D3, the distortion correction means 3 first holds the whole of the reference image D2 in the image memory 31. The reference image D2 written to the image memory 31 is an image having distortion as shown in FIG. 7(B).

The pixel value interpolation means 32 reads out values of pixels (white square marks) of the reference image D2 situated in the vicinity of the position (black circle mark in FIG. 7(B)) corresponding to the position of each pixel of the distortion-corrected division region image D3 (black circle mark in FIG. 7(C)) from the image memory 31 and determines value of the pixel (black circle mark) of the distortion-corrected division region image D3 by an interpolation process using the pixel values which have been read out.

A process of determining the position in the reference image D2 corresponding to the position of each pixel of the distortion-corrected division region image D3 is performed by the distortion-correction-parameter output means 33 by means of coordinate transformation. Coordinates (h, v) of the position (interpolation position) in the reference image D2, for example, an interpolation position Qb in FIG. 7(B), corresponding to the coordinates (p, q) of the position of each pixel of the distortion-corrected division region image D3, for example, a pixel Qc in FIG. 7(C), are calculated from a distortion rate of the image.

When the interpolation position has been calculated, information indicating the calculated interpolation position and positions of its vicinal pixels, such as pixels P11, P12, P21 and P22, is supplied from the distortion-correction-parameter output means 33 as interpolation position information. The information indicating the positions of the vicinal pixels may be information indicating relative positions with respect to the interpolation position. The method of calculating the interpolation position employed by the distortion-correction-parameter output means 33 will be described later.

The pixel value interpolation means 32 performs the interpolation on the basis of the interpolation position information supplied from the distortion-correction-parameter output means 33, by reading out pixel values of pixels that have been stored in the image memory 31 and have been specified as the vicinal pixels in the interpolation position information.

Nearest neighbor interpolation, bi-linear interpolation, bi-cubic interpolation and so on can be employed as the method of the interpolation.

A case of employing the bi-linear interpolation will be explained here. The bi-linear interpolation is a widely known calculation method and determines an interpolated pixel value regarding the interpolation position indicated by the black circle mark in FIG. 7(B) from the values of four vicinal pixels by means of linear approximation. As shown in FIG. 7(B), the value of the pixel immediately on the upper left of the interpolation position Qb (whose coordinates are represented by (h, v)) corresponding to the pixel Qc (whose coordinates are represented by (p, q)) of the distortion-corrected division region image D3 (the pixel which is situated to the left of Qb and above Qb, and is closest to Qb) is assumed to be P11, the value of the pixel immediately on the upper right of the interpolation position Qb (the pixel which is situated to the right of Qb and above Qb, and is closest to Qb) is assumed to be P21, the value of the pixel immediately on the lower left of the interpolation position Qb (the pixel which is situated to the left of Qb and below Qb, and is closest to Qb) is assumed to be P12, and the value of the pixel immediately on the lower right of the interpolation position Qb (the pixel which is situated to the right of Qb and below Qb, and is closest to Qb) is assumed to be P22. In this case, the value of the pixel Qc after the interpolation is determined by the following expression (1):

$$Qc=(1-m)(1-n)P11+m(1-n)P21+(1-m)nP12+mnP22 \quad (1)$$

Incidentally, in the reference image D2, a distance between adjoining pixels is indicated as "1" in both the horizontal direction and the vertical direction, m and n represent distances in the horizontal direction and vertical direction from the pixel immediately on the upper left of the interpolation position (P11 in the case of Qb) to the interpolation position, and thus m and n represent a relative position of the interpolation position (h, v) with respect to its vicinal pixel. Assuming that h and v are both real numbers having an integer part and a decimal part and h and v are both integers in regard to each pixel (white square marks) of the reference image D2, m represents a decimal part of h and n represents a decimal part of v.

The distortion-corrected division region image D3 is generated by using the values obtained by performing the interpolation process as shown in FIGS. 7(B) and 7(C) as the pixel values of the pixels of the distortion-corrected division region image D3. Since the above-described interpolation process has an effect similar to a low-pass filter process, high-frequency components have decreased in comparison with the reference image D2 as the image before the distortion correction.

The distortion-correction-parameter output means 33 includes an interpolation-position-information output means 33a and outputs a distortion correction parameter determined from the distortion correction processing mode Sdc for the reference image D2. Here, the distortion correction parameter is the interpolation position information (interpolation position parameter) outputted from the interpolation-position-information output means 33a.

The interpolation-position-information output means 33a outputs the coordinates (h, v) in the reference image D2 corresponding to the coordinates (p, q) in the distortion-corrected division region image D3.

The corresponding coordinates (h, v) are determined on the basis of the distortion correction processing mode Sdc for the reference image D2 determined by the distortion-correction-target-region specification means 1. Specifically, it is possible to calculate the coordinates (h, v) on the basis of a position of the reference image D2 in the captured image D103, the distortion rate corresponding to a distance from the optical axis center of the captured image D103 which is dependent on the distortion correction characteristic Chd of the reference image D2, and the distortion correction processing mode Sdc.

The optical distortion characteristic Chc of the captured image D103 can be stored in the form of a look-up table (LUT). When the LUT is used, calculation of the distortion rate corresponding to the distance from the optical axis center of the captured image D103 becomes unnecessary, and thus the processing by the interpolation-position-information output means 33a can be simplified.

The scaling ratio calculation means 6 calculates the division region scaling ratio MR(s, t) in regard to each distortion-corrected division region image D3(s, t) outputted from the distortion correction means 3.

The division region scaling ratio MR(s, t) in regard to each distortion-corrected division region image D3(s, t) is calculated from the size of the distortion-corrected division region image D3(s, t) and the size of the division region Ab in the reference image D2(s, t) corresponding to the distortion-corrected division region image D3(s, t) such as the size of the rectangular region Ac circumscribing the division region Ab.

Information on the size of the distortion-corrected division region image D3(s, t) is supplied from the distortion correction means 3. Information on the size of the aforementioned rectangular region Ac is supplied from the reference image generation means 2.

For the calculation of the division region scaling ratio MR(s, t), methods such as calculating a ratio between the area (the number of pixels) of the rectangular region (Ac in the above example) and the area of the distortion-corrected division region image D3 can be employed. Instead of using the areas, it is also possible to calculate the division region scaling ratio MR as a greater value between a ratio of the number of horizontal pixels of the distortion-corrected division region image D3 to the number of horizontal pixels of the rectangular region (horizontal scaling ratio) and a ratio of the number of vertical pixels of the distortion-corrected division region image D3 to the number of vertical pixels of the rectangular region (vertical scaling ratio). With this method, the division region scaling ratio can be calculated by simple calculation and the configuration of the scaling ratio calculation means 6 can be simplified.

As mentioned earlier, the pixel gain calculation means 7 calculates the gain (pixel gain) Gp(p, q) regarding the pixel D4(p, q) of the distortion-corrected image D4 on the basis of the division region scaling ratios MR(s, t) regarding a plurality of distortion-corrected division region images D3(s, t) calculated by the scaling ratio calculation means 6 and outputs the calculated pixel gain Gp(p, q) to the adjustment means 8.

The pixel gain Gp(p, q) of each pixel D4(p, q) of the distortion-corrected image D4 is calculated from the division region scaling ratio MR(s, t) regarding the distortion-corrected division region image D3(s, t) including the pixel PD3(p, q) corresponding to the pixel D4(p, q) and division region scaling ratios MR(s+i, t+j) (i=−1, 0 or 1, j=−1, 0 or 1) regarding one or more distortion-corrected division region images D3(s+i, t+j) adjoining the distortion-corrected division region image D3(s, t).

The pixel gain calculation means 7 includes a division-region-gain calculation means 71 and a gain interpolation means 72.

The division-region-gain calculation means 71 calculates a gain (division region gain) Gra(s, t) regarding each distortion-corrected division region image D3(s, t) on the basis of the division region scaling ratio MR(s, t) of each distortion-corrected division region image D3(s, t) calculated by the scaling ratio calculation means 6 and outputs the calculated division region gain Gra(s, t) to the gain interpolation means 72.

The gain (division region gain) Gra(s, t) regarding each distortion-corrected division region image D3(s, t) is determined from the division region scaling ratio MR(s, t) regarding the distortion-corrected division region image D3(s, t).

The gain (division region gain) Gra(s, t) regarding each distortion-corrected division region image D3(s, t) is determined so that a division region gain Gra(s, t) regarding a distortion-corrected division region image D3(s, t) whose division region scaling ratio MR is the maximum among all the distortion-corrected division region images D3 used for forming the distortion-corrected image D4 is 1 and a division region gain Gra(s, t) regarding a distortion-corrected division region image D3(s, t) whose division region scaling ratio MR is the minimum among all the distortion-corrected division region images D3 used for forming the distortion-corrected image D4 is a positive value less than 1, for example.

An example of a method for generating the division region gains Gra(s, t) so that the division region gains Gra(s, t) satisfy the above condition will be described below.

First, the division region scaling ratio MR(s, t) is converted into a logarithmic value MRL(s, t) according to the following expression (2), for example:

$$MRL(s,t) = \log_2(MR(s,t)) \times 255 \times Ka \quad (2)$$

Subsequently, a maximum value MRLmax of the logarithmic values MRL(s, t) regarding all the distortion-corrected division region images D3(s, t) (s=1 to S, t=1 to T) used for generating the distortion-corrected image D4 is determined.

Subsequently, by using MRLmax, a coefficient Lk(s, t) is calculated according to the following expression (3):

$$Lk = 255 - Kb \times MRLmax \quad (3)$$

Finally, the division region gain Gra(s, t) regarding each distortion-corrected division region image D3(s, t) is determined according to the following expression (4):

If $Kb \times MRL(s,t) + Lk < 0$, $Gra(s,t) = 1/256$

Otherwise, $$Gra(s,t) = (Kb \times MRL(s,t) + Lk + 1)/256 \quad (4)$$

Ka in the expression (2) is determined so that MRLmax equals 255. In this case, if MRmax=16, for example, Ka=¼ holds. MRmax is determined depending on a factor such as a size of the image memory 31 mounted on the distortion correction means 3.

A value of Kb in the expression (4) is previously determined while image quality is checked.

Figure 8:
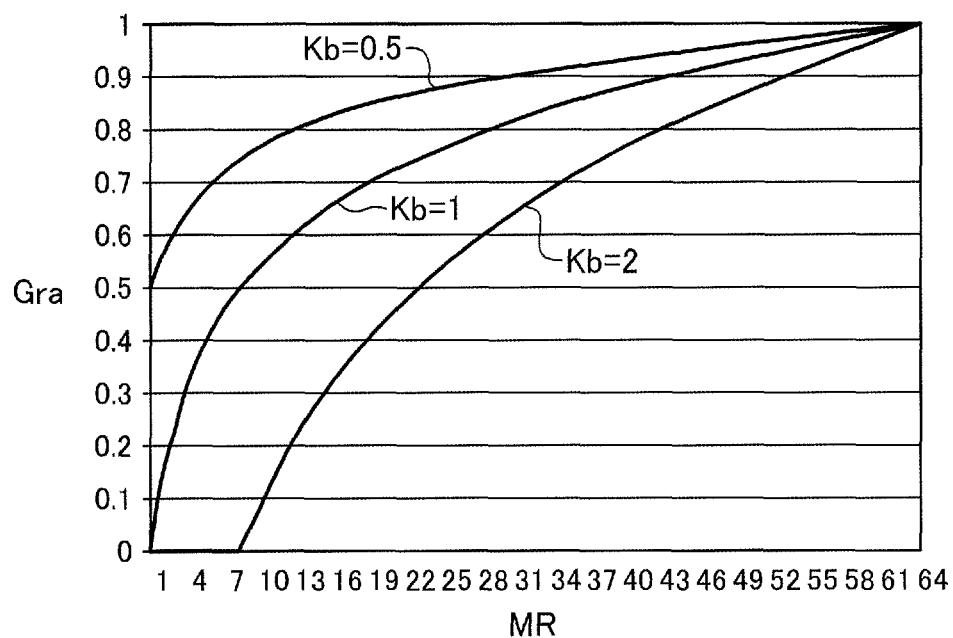
FIG. 8 is a diagram showing an example of a relationship between a division region scaling ratio and a division region gain.

FIG. 8 shows a change in a value of the division region gain Gra with respect to the division region scaling ratio MR in a case where MRmax=64 and Ka=⅙.

The calculation of the maximum value MRLmax and the calculation of the division region gain Gra(s, t) explained above are carried out after the processing for all the distortion-corrected division region images D3 forming the distortion-corrected image D4 is finished.

While the above explanation of the method for generating the division region gain Gra(s, t) has assumed cases where the division region scaling ratio MR(s, t) is substantially 1 to 128, there are cases where the division region scaling ratio MR(s, t) takes on a value less than 1. In such cases where the division region scaling ratios MR(s, t) include a value less than 1, it is possible to correct all the division region scaling ratios MR(s, t) so that a minimum value of the corrected division region scaling ratios CMR(s, t) equals 1 and then perform the processing similar to the above-described processing by using the corrected division region scaling ratios CMR(s, t). As above, the division region scaling ratios MR(s, t) are not limited to those indicating magnification of an image but can also be those indicating reduction of an image.

The gain interpolation means 72 calculates the gain (pixel gain) Gp(p, q) regarding each pixel of the distortion-corrected image D4 on the basis of a plurality of division region gains Gra(s, t) outputted from the division-region-gain calculation means 71 and outputs the calculated pixel gain Gp(p, q) to the adjustment means 8.

In the calculation of the pixel gain Gp(p, q) of each pixel, the gain interpolation means 72 regards each of the plurality of division region gains Gra(s, t) as the gain at the central position of its corresponding distortion-corrected division region image D3(s, t) and calculates the pixel gain of each pixel by means of linear interpolation.

For the linear interpolation for calculating the pixel gain Gp(p, q) of each pixel, the division region gain Gra(s, t) of the distortion-corrected division region image D3(s, t) including the pixel PD3(p, q) corresponding to the pixel (attention pixel) D4(p, q) and division region gains Gra(s+i, t+j) (i=−1, 0 or 1, j=−1, 0 or 1) of adjoining distortion-corrected division region images D3(s+i, t+j) are used.

Figure 9:
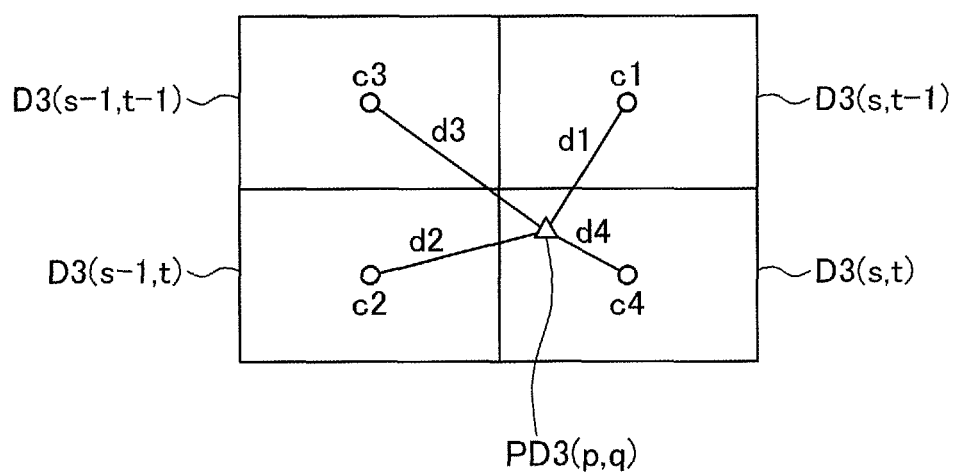
FIG. 9 is a diagram showing a method for calculating a pixel gain by using the division region gains.

For example, in cases where the pixel PD3(p, q) of the distortion-corrected division region image D3 corresponding to the attention pixel D4(p, q) of the distortion-corrected image D4 is situated above and to the left of the center (a position indicated by a reference character c4) of the distortion-corrected division region image D3($s, t$) as shown in FIG. 9, the pixel gain Gp(p, q) regarding the attention pixel D4(p, q) is calculated by using the division region gain Gra($s, t-1$) of the distortion-corrected division region image D3($s, t-1$) adjoining the distortion-corrected division region image D3($s, t$) from above, the division region gain Gra($s-1, t$) of the distortion-corrected division region image D3($s-1, t$) adjoining the distortion-corrected division region image D3($s, t$) from the left, the division region gain Gra($s-1, t-1$) of the distortion-corrected division region image D3($s-1, t-1$) adjoining the distortion-corrected division region image D3($s, t$) from the upper left, and the division region gain Gra($s, t$) of the distortion-corrected division region image D3($s, t$), and by taking the average while weights w1, w2, w3, w4 corresponding to distances d1, d2, d3, d4 from the centers c1, c2, c3, c4 of the respective distortion-corrected division region images are assigned. The weights w1, w2, w3, w4 are decreased with increase in the distances d1, d2, d3, d4.

Specifically, the pixel gain Gp(p, q) can be calculated with an arithmetic expression similar to the aforementioned expression (1) by using horizontal direction components and vertical direction components of the distances d1, d2, d3 and d4. A value corresponding to m in the expression (1) may be used as the horizontal direction component and a value corresponding to n in the expression (1) may be used as the vertical direction component.

In the following, functions and effects of the image processing device (distortion correction processing unit 104) according to this embodiment will be described.

As examples of correcting distortion of an image captured with the fisheye lens, there are cases where the processing is carried out as shown in FIGS. 3(A) and 3(B) or as shown in FIGS. 4(A) and 4(B).

In the example of FIGS. 3(A) and 3(B), all the sizes of the regions Rb(1, 1)-Rb(6, 6) in the image after the distortion correction are the same, whereas the sizes of the regions Ra(l, 1)-Ra(6, 6) in the image before the correction are not the same; regions at the same distance from the optical axis center of the fisheye image are of the same size and the closer to the optical axis center the region is, the larger the size of the region is. For example, the following relationship holds:

"the size of region $Ra(1,1)$"="the size of region $Ra(6,6)$"<"the size of region $Ra(2,2)$"="the size of region $Ra(5,5)$"<"the size of region $Ra(3,3)$"="the size of region $Ra(4,4)$"

This means that the division region scaling ratios MR in the distortion correction process for the regions Ra(1, 1)-Ra(6, 6) are not the same, and it is clear that the division region scaling ratio MR increases as the region becomes closer to the peripheral part of the fisheye image.

In the example of FIGS. 4(A) and 4(B), all the sizes of the regions Rd(1, 1)-Rd(8, 4) in the image after the correction are the same, whereas the sizes of the regions Rc(1, 1)-Rc(8, 4) in the image before the correction are not the same; regions at the same distance from the optical axis center of the fisheye image are of the same size and the closer to the optical axis center the region is, the larger the size of the region is. For example, the following relationship holds:

"the size of region $Rc(1,1)$"="the size of region $Rc(5,1)$"≥"the size of region $Rc(2,2)$"="the size of region $Rc(6,2)$"≥"the size of region $Rc(3,3)$"="the size of region $Rc(7,3)$"≥"the size of region $Rc(4,4)$"="the size of region $Rc(8,4)$"

This means that the division region scaling ratios MR in the distortion correction process for the regions Rc(1, 1)-Rc(8, 4) are not the same similarly to the case of FIGS. 3(A) and 3(B); however, it is clear that the division region scaling ratio MR increases as the region becomes closer to the central part of the fisheye image differently from the case of FIGS. 3(A) and 3(B).

In both of the case of FIGS. 3(A) and 3(B) and the case of FIGS. 4(A) and 4(B), regions with high division region scaling ratios MR have less high-frequency components in the distortion-corrected division region image D3 in comparison with regions with low division region scaling ratios MR. Thus, without the adjustment using the adjustment means 8 or the like, the distortion-corrected image D4 as the output of the image combination means 4 amount to having image quality varying among the regions of the distortion-corrected division region images D3.

In the image processing device of this embodiment, the pixel gain Gp of each pixel in the distortion-corrected division region image D3 is calculated by performing the linear interpolation on the division region gains Gra that have been determined so as to increase with increase in the division region scaling ratio MR calculated by the scaling ratio calculation means 6, and the adjusted high-frequency component image D8 obtained by multiplying the high-frequency component image D5 outputted from the high-frequency-component image generation means 5 by the pixel gain Gp is added to the distortion-corrected image D4.

The adjusted high-frequency component image D8 is an image obtained by multiplication by a relatively high gain Gp in parts where the high-frequency components of the distortion-corrected image D4 is less due to a relatively high division region scaling ratio MR and multiplication by a relatively low gain Gp in parts where the high-frequency components of the distortion-corrected image D4 is not less due to a relatively low division region scaling ratio MR. Therefore, the distortion-corrected image D104 obtained by adding the distortion-corrected image D4 and the adjusted high-frequency component image D8 together has effects in that the difference in the sense of resolution among the regions of the distortion-corrected division region images D3 is lessened and the image quality becomes more natural.

In the image processing device of this embodiment, the pixel gain Gp is calculated not from local image scaling ratio based on the optical distortion characteristic Chc at the time of the distortion correction process but from the division region scaling ratios MR at the time of the distortion correction process by the distortion correction means 3, and the adjusted high-frequency component image D8 is generated by using the calculated pixel gains Gp. Therefore, the emphasis of the high-frequency components can be carried out appropriately even in a case where processing by means of different distortion correction modes such as generation of a panoramic image is performed.

Further, since the division region scaling ratio MR is converted into the logarithmic value MRL and the division region gain Gra regarding the distortion-corrected division region image D3 is determined on the basis of the logarithmic value, there is an advantage in that the increase in the division region gain Gra is restrained as the division region scaling ratio MR approaches the maximum value. Furthermore, adjusting the value of Kb in the expression (3) makes it possible to adjust the division region gain Gra in cases where the division region scaling ratio approaches the minimum value.

Incidentally, while the division region scaling ratio MR is converted into the logarithmic value MRL and the division region gain Gra is determined on the basis of the logarithmic value MRL in the above example, the present invention is not restricted to this example and other methods can be employed as long as the conversion is of a type in which a conversion characteristic curve indicating the change in the division region gain Gra with respect to the division region scaling ratio MR is convex upward, that is, in which the ratio of the increase in the division region gain Gra to the increase in the division region scaling ratio MR gradually decreases with increase in the division region scaling ratio MR.

Second Embodiment

Figure 10:
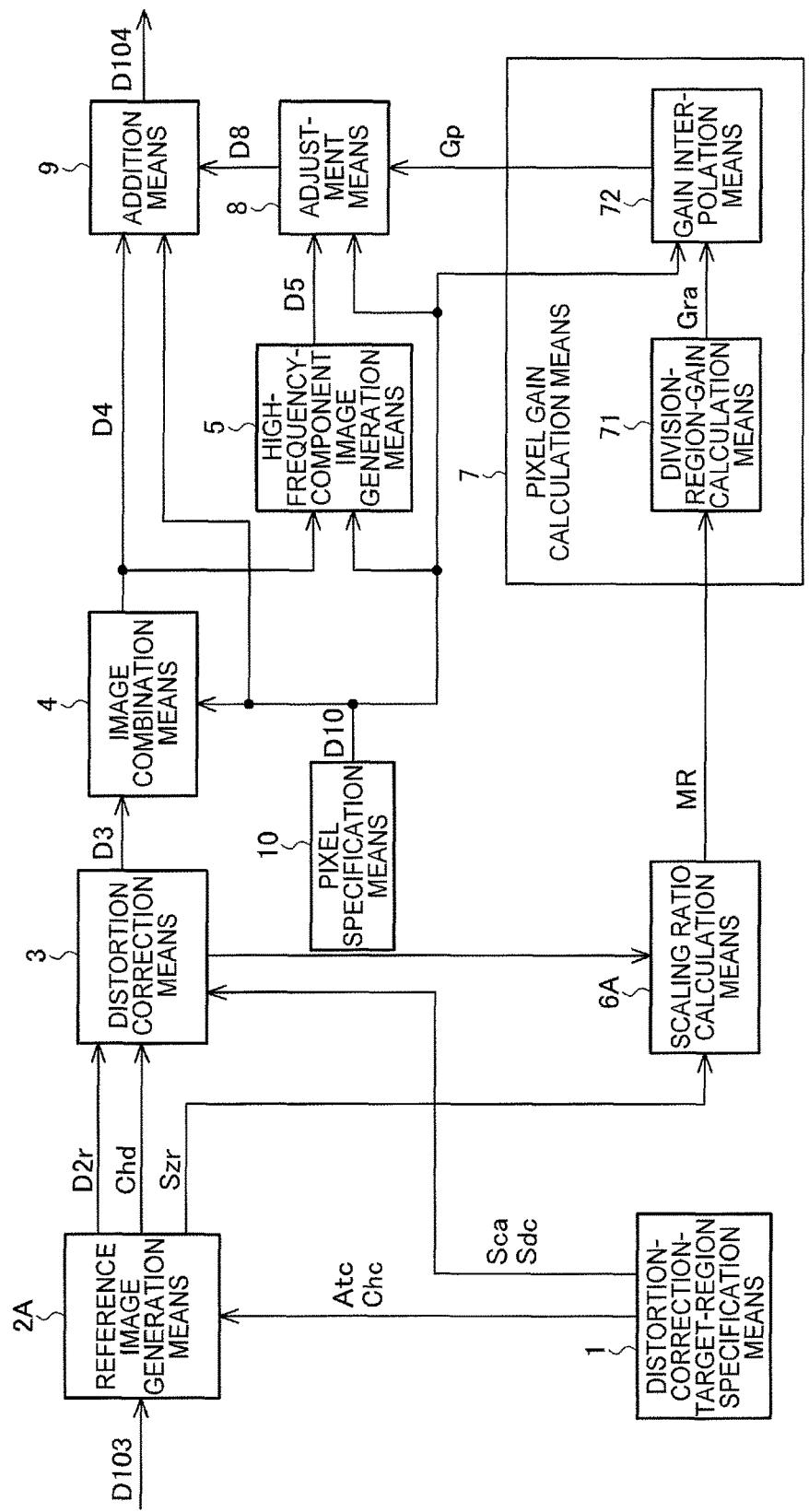
FIG. 10 is a block diagram showing an image processing device according to a second embodiment of the present invention.

FIG. 10 is a diagram showing an image processing device according to a second embodiment of the present invention. In FIG. 10, the operation of each means other than a reference image generation means 2A and a scaling ratio calculation means 6A is equivalent to that described in the first embodiment.

Figure 11:
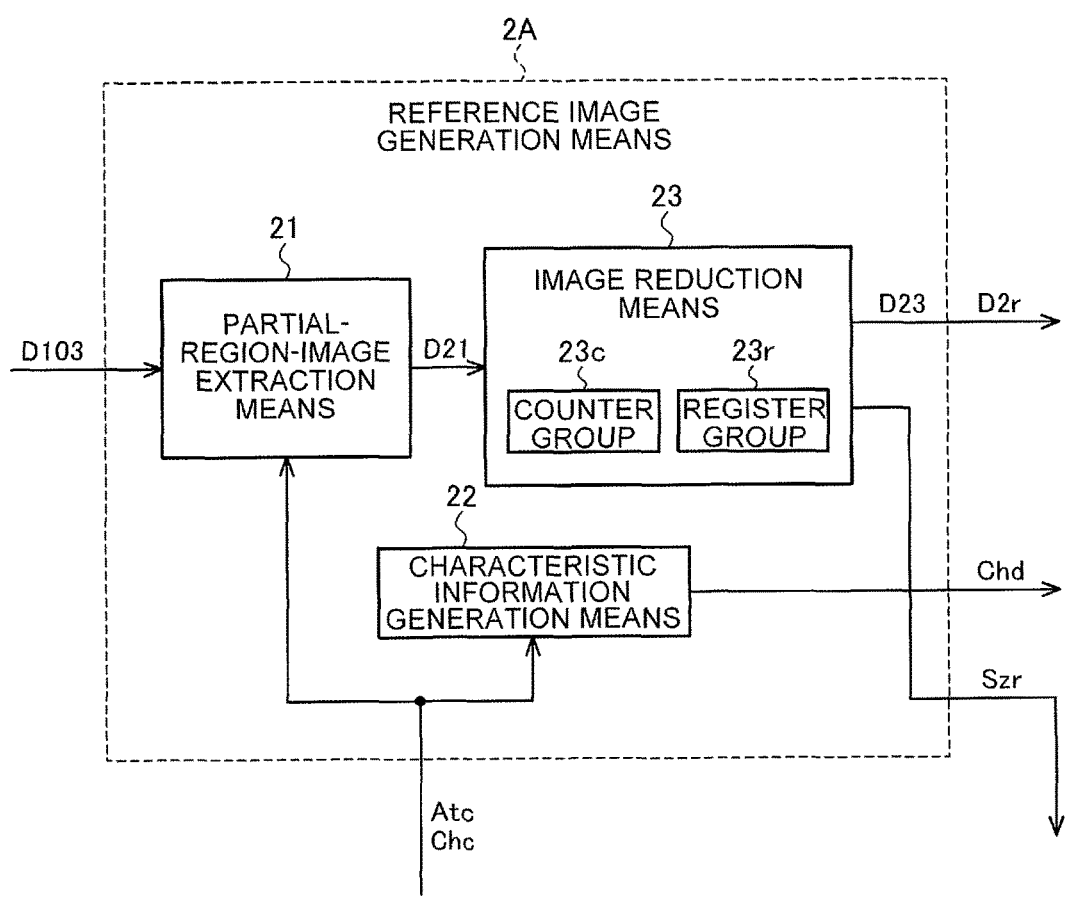
FIG. 11 is a block diagram showing an example of a configuration of a reference image generation means employed in the second embodiment.

As shown in FIG. 11, the reference image generation means 2A includes the partial-region-image extraction means 21, the characteristic information generation means 22, and an image reduction means 23. The partial-region-image extraction means 21 and the characteristic information generation means 22 are equivalent to those shown in FIG. 5.

The image reduction means 23 generates a reduced partial region image D23 by reducing the partial region image D21 outputted from the partial-region-image extraction means 21. The reference image generation means 2A supplies the reduced partial region image D23 to the distortion correction means 3 as a reference image D2r. The reduced partial region image D23 is an image having a smaller number of pixels than the partial region image D21 before the reduction.

An example of the partial region image D21 before the reduction and its corresponding reduced partial region image D23 in a case where a reduction ratio is 2 will be explained with reference to FIGS. 12(A) and 12(B).

Figure 12A:
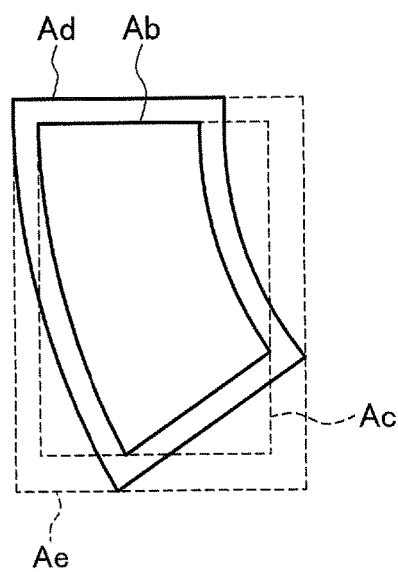
FIGS. 12(A) and 12(B) are diagrams showing a division region in an example of a partial region image before reduction and a region corresponding to the division region in a corresponding partial region image after reduction and a rectangular region circumscribing the region.

In FIG. 12(A), the reference characters Ab, Ac, Ad and Ae respectively indicate the same regions as those shown in FIG. 6(A). The image of the region Ae is extracted as the partial region image D21 before the reduction.

Figure 12B:
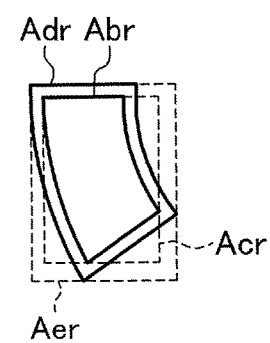

In FIG. 12(B), a region Abr is a region corresponding to the division region Ab in the partial region image D21 before the reduction and is referred to also as a reduced division region. The image of the reduced division region Abr is an image corresponding to the distortion-corrected division region image D3.

A rectangular region (reduced rectangular region) circumscribing the reduced division region Abr is indicated by a reference character Acr. Further, a region in the vicinity of the reduced division region Abr is indicated by a reference character Adr, and a rectangular region including the reduced division region Abr and its vicinal region Adr is indicated by a reference character Aer.

Thanks to the reduction, even in a case where the partial region image D21 exceeds a maximum value SZmax of a size of an image that can be processed by the distortion correction means 3, it is possible to generate the smaller partial region image D23 by reducing the partial region image D21 to the maximum value SZmax and supply the reduced region image D23 to the distortion correction means 3 as the reference image D2r.

Further, the image reduction means 23 supplies information indicating a size of the reduced division region Abr in the reference image D2r to the scaling ratio calculation means 6A.

As the size of the reduced division region Abr, a size of the rectangular region Acr circumscribing the region Abr is used, for example.

The scaling ratio calculation means 6A calculates the division region scaling ratio MR from the size of the reduced division region Abr in the reference image D2r corresponding to the distortion-corrected division region image D3 obtained by the distortion correction means 3 such as the size Szr of the rectangular region Acr circumscribing the region Abr, and the size of the distortion-corrected division region image D3.

For example, the division region scaling ratio MR can be defined as a greater value between a ratio of the number of horizontal pixels of the distortion-corrected division region image D3 to the number of horizontal pixels of the rectangular region Acr regarding the reference image D2r outputted from the reference image generation means 2A (horizontal scaling ratio) and a ratio of the number of vertical pixels of the distortion-corrected division region image D3 to the number of vertical pixels of the rectangular region Acr (vertical scaling ratio).

The image reduction by the image reduction means 23 will be explained in more detail below.

The image reduction by the image reduction means 23 is carried out by means of a projection method, for example. In the reduction by means of the projection method, a pixel value of each pixel of the reduced image is determined by performing weighted addition of pixel values of the original image according to a ratio of an area occupied by a pixel of the original image in a position of the pixel of the reduced image when the original image is projected onto the reduced image.

The process of determining the pixel value of each pixel of the reduced image in the projection method will be explained below with reference to FIG. 13(A) and FIGS. 14 to 16.

The process shown in FIG. 13(A) and FIGS. 14 to 16 is a reduction process in a one-dimensional direction. Reduction in two-dimensional directions can be carried out by performing the one-dimensional direction process in one direction such as the horizontal direction and thereafter performing the same process in another direction such as the vertical direction.

In the reduction by the projection method shown in FIG. 13(A) and FIGS. 14 to 16, the reduction ratio RRT is represented by a ratio of a pixel size WN (area occupied by each pixel) in the image before the reduction to a pixel size WD in the image after the reduction, a starting position of the image after the reduction (a position of a starting-side end of the first pixel) relative to a starting position of the image before the reduction is represented by a reduction offset WF, and the pixel value of each pixel of the image after the reduction is calculated by weighted addition of pixel values of a plurality of pixels of the image D2 before the reduction.

In the following explanation of the reduction process, the image before the reduction is referred to as an input image and the image after the reduction is referred to as an output image. Further, a pixel of the input image is referred to as an input pixel and a pixel of the output image is referred to as an output pixel.

Furthermore, an end on the starting-side of each pixel is referred to as a left end and a pixel's end on the side (ending side) opposite to the starting side is referred to as a right end.

Figure 15:
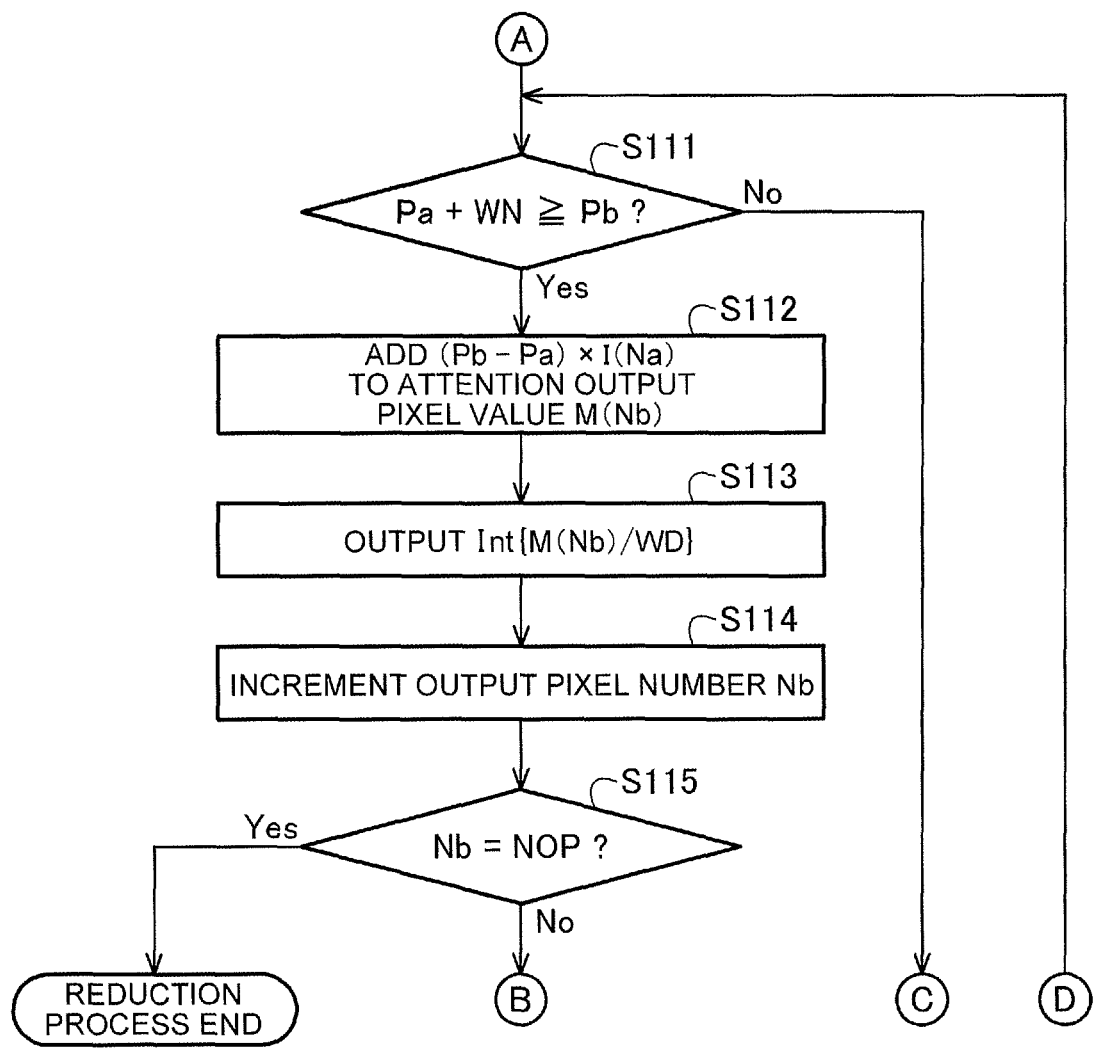
FIG. 15 is a flowchart showing the flow of the process for calculating the pixel values of the reduced image by the image reduction means.
Figure 16:
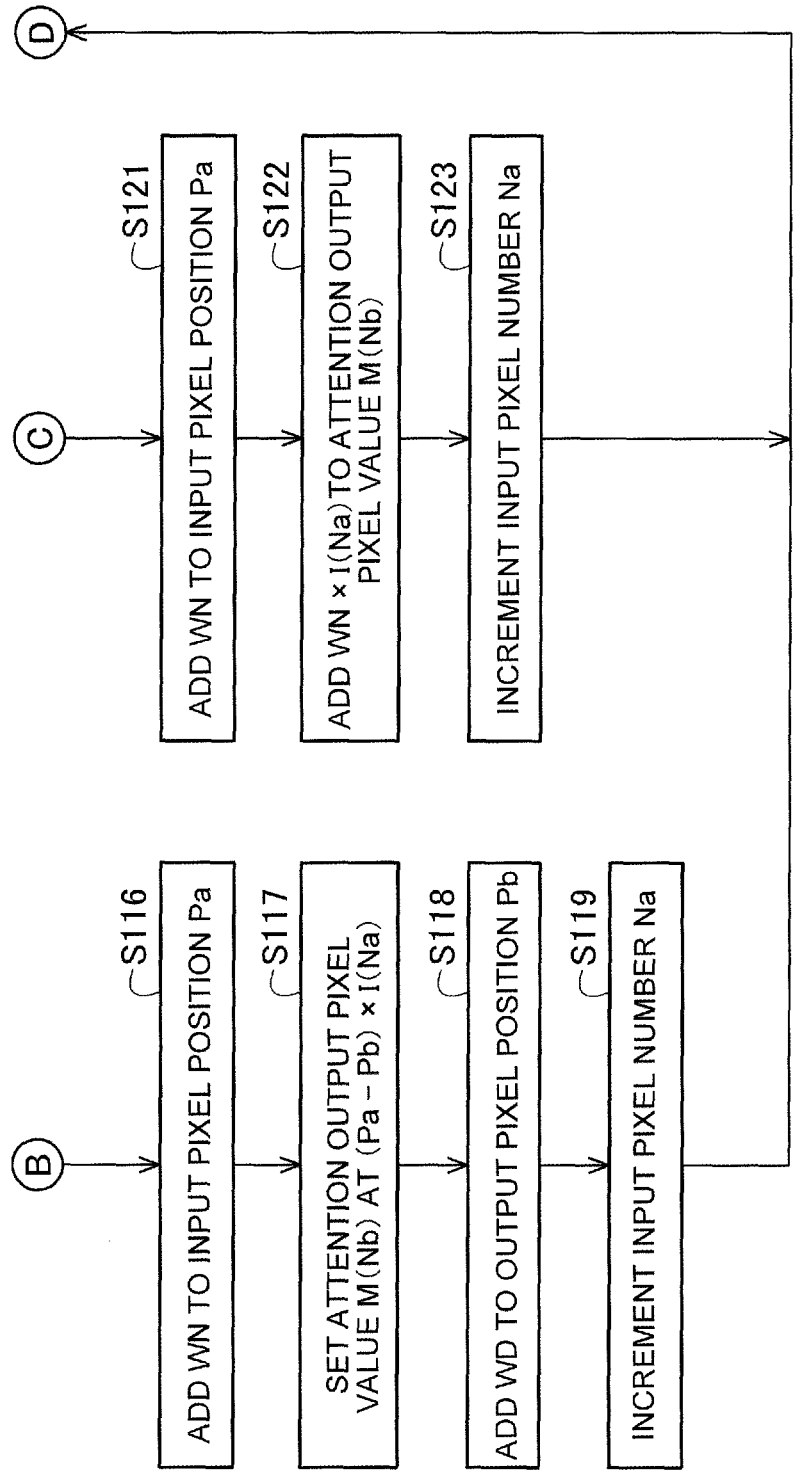
FIG. 16 is a flowchart showing the flow of the process for calculating the pixel values of the reduced image by the image reduction means.

In the process of FIGS. 14 to 16, pixels of the output image are successively selected from the starting position's side while pixels of the input image are successively selected from the starting position's side, and a pixel value of the selected pixel of the output image is determined by calculating the cumulative sum of values obtained by multiplying a ratio of an area of each selected pixel of the input image projected onto the selected pixel of the output image to the whole of the selected pixel of the input image (one-dimensionally, a pixel length ratio) by a pixel value of the selected pixel of the input image.

Such a process is performed successively for every pixel of the output image.

Figure 13A:
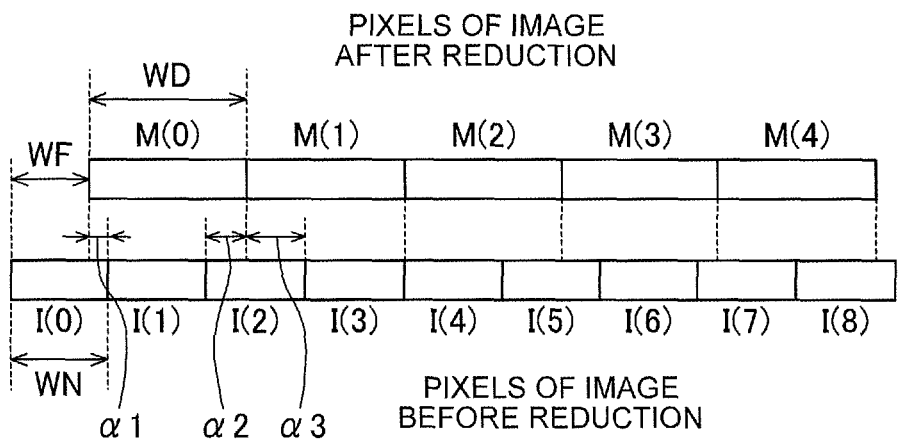
FIGS. 13(A) and 13(B) are diagrams showing different examples of image reduction performed by an image reduction means of the reference image generation means.

In FIG. 13(A), numbers Na=0, 1, 2, . . . are successively assigned to the pixels of the input image from the starting position's side, and a pixel having the number Na and its pixel value are indicated by a reference character I(Na).

Similarly, numbers Nb=0, 1, 2, . . . are successively assigned to the pixels of the output image from the starting position's side, and a pixel having the number Nb and its pixel value are indicated by a reference character M(Nb). Further, a pixel value of each output pixel under the reduction process, that is, a provisional pixel value, is also indicated by the same reference character M(Nb). There are cases where the provisional pixel value is referred to simply as the pixel value.

In the weighted addition, in order to determine the ratio of a part of each pixel of the input image projected onto each pixel of the output image to the whole of the pixel of the input image, a position of an end of each pixel of the output image and a position of an end of each pixel of the input image are determined. This position is represented by a distance from the starting-side end of the input image. The position of the end of each pixel of the input image is represented by an integral multiple of WN, while the position of the end of each pixel of the output image is represented by the sum of WF and an integral multiple of WD. Each weight coefficient for the weighted addition is determined from the relationship between a position of an end of a pixel of the input image and a position of an end of a pixel of the output image.

In the following explanation, a right end position Pa of the pixel being the target of the process (pixel under the process) in the input image will be referred to as an input pixel position, and a right end position Pb of the pixel being the target of the process (pixel under the process) in the output image will be referred to as an output pixel position.

The input pixel number Na and the output pixel number Nb are counted by a counter group 23c provided in the image reduction means 23, while the input pixel position Pa and the output pixel position Pb are held in a register group 23r provided in the image reduction means 23.

Further, in the output image, the pixel being the target of the process will be referred to also as an attention output pixel, and the number of pixels of the output image in the processing direction (the number of pixels aligned in the one-dimensional direction) is represented as NOP. The processing direction is the horizontal direction when the process is performed in the horizontal direction, or is the vertical direction when the process is performed in the vertical direction.

In the following, processing in each step in the flowcharts of FIGS. 14 to 16 will be described in turn.

In a step S101, whether the input image size WN is greater than the reduction offset WF (pixel starting position of the reduced image) or not is judged.

If Yes, the process advances to a step S102. If No, the process advances to a step S106.

In the step S102, the input pixel number Na is set at 0 and the output pixel number Nb is set at 0.

In a step S103, the input pixel position Pa (the position of the right end of the input pixel being processed) is set at the input pixel size WN and the output pixel position Pb (the position of the right end of the output pixel being processed) is set at the sum of the reduction offset WF and the output pixel size WD.

In a step S104, the pixel value M(0) of the first output pixel is set at (WN−WF)×I(0).

In a step S105, the input pixel number Na is incremented (increased by 1).

In the step S106, the input pixel number Na is set at 1 and the output pixel number Nb is set at 0.

In a step S107, the input pixel position Pa is set at WN×2 (twice the input pixel size) and the output pixel position Pb is set at the sum of the reduction offset WF and the output pixel size WD.

In a step S108, the first output pixel value M(0) is set at (WN×2−WF)×I(1).

In a step S109, the input pixel number Na is incremented.

After the step S105 or S109, the process advances to a step S111.

In the step S111, whether or not Pa+WN (the right end of the pixel I(1) next to the pixel I(0) being processed) is greater than or equal to Pb (the right end of the pixel M(0) being processed, that is, the attention output pixel M(0)) is judged. If Yes, the process advances to a step S112. If No, the process advances to a step S121.

In the step S112, (Pb−Pa)×I(Na) is added to the pixel value M(Nb) of the attention output pixel.

In a step S113, the pixel value M(Nb) of the attention output pixel is normalized by dividing the pixel value M(Nb) by the output pixel size WD, further converted into an integer value, and outputted. The normalization and conversion is represented by Int{M(Nb)/WD}. Here, Int{A} represents a value obtained by the conversion of A into an integer value. The conversion into an integer value is carried out by rounding off the number to the nearest integer value, for example.

In a step S114, the output pixel number Nb is incremented.

In a step S115, whether Nb equals the number NOP of output pixels or not is judged.

If Yes, the reduction process is ended.

If No, the process advances to a step S116.

In the step S116, WN is added to the input pixel position Pa.

In a step S117, the pixel value M(Nb) of the attention output pixel is set at (Pa−Pb)×I(Na).

In a step S118, the output pixel size WD is added to the output pixel position Pb.

In a step S119, the input pixel number Na is incremented.

In the step S121, WN is added to the input pixel position Pa.

In a step S122, WN×I(Na) is added to the pixel value M(Nb) of the attention output pixel.

In a step S123, the input pixel number Na is incremented.

After the step S119 or S123, the process returns to the step S111.

The processing of the steps S111 to S123 is repeated until it is judged in the step S115 that Nb has become equal to the number NOP of output pixels, and the reduction process ends when Nb reaches the number NOP of output pixels.

In the following, the change in Na, Nb, Pa, Pb and M(Nb) in the processing of each step in FIGS. 14 to 16 will be explained with reference to FIG. 17 by taking the case of FIG. 13(A) as an example.

In the case of FIG. 13(A), WN>WF holds, and thus the step S101 results in Yes and the process advances to the step S102.

In the step S102, the input pixel number Na is set at 0 and the output pixel number Nb is set at 0.

In the step S103, the input pixel position Pa is set at WN and the output pixel position Pb is set at the sum of the reduction offset WF and the output pixel size WD.

As the result of this processing, the right end (WN) of the pixel I(0) in FIG. 13(A) is set as Pa and the right end (WF+WD) of the pixel M(0) is set as Pb.

In the step S104, the pixel value M(0) of the first pixel is set at (WN−WF)×I(0). Namely, the pixel value M(0) is set at the product of the pixel value I(0) and the length of the part α1 (=WN−WF) from the left end of the pixel M(0) to the right end of the pixel I(0).

In the step S105, the input pixel number Na is incremented to 1.

After the step S105, the process advances to the step S111. In the case of FIG. 13(A), the process advances to the step S111 via the step S104. Therefore, Pa at that time represents WN, that is, the right end position of I(0), and thus Pa+WN represents the right end position of I(1). On the other hand, Pb represents WF+WD, that is, the right end position of M(0).

Accordingly, Pa+WN≥Pb does not hold and the subsequent step is the step S121.

In the step S121, WN is added to the input pixel position Pa=WN, and consequently, Pa becomes WN×2 (i.e., the right end position of I(1)).

In the next step S122, WN×I(Na)=WN×I(1) is added to the pixel value M(Nb)=M(0) of the attention output pixel, and consequently, M(Nb) reaches:

$$M(Nb) = M(0)$$
$$= (WN - WF) \times I(0) + WN \times I(1)$$

In the next step S123, the input pixel number Na is incremented to 2.

After the step S123, the process returns to the step S111.

In this case, Pa is WN×2 (i.e., the right end of I(1)) and Pb is WF+WD (i.e., the right end of M(0)), and thus Pa+WN≥WF+WD holds.

Therefore, next, the process advances to the step S112.

When the process advances to the step S112, Pa is WN×2 (i.e., the right end of I(1)), Pb is WF+WD (i.e., the right end of M(0)), and I(Na)=I(2).

Therefore, (WF+WD−WN×2)×I(2) as (Pb−Pa)×I(Na) is added to the pixel value M(0). Namely, the product of the length α2 from the right end of the pixel I(1) (i.e., the left end of I(2)) to the right end of the pixel M(0) (=WF+WD−WN× 2) and the pixel value I(2) is added to the pixel value M(0).

As the result of the addition, M(0) becomes:

$$(WN-WF) \times I(0) + WN \times I(1) + (WF+WD-WN \times 2) \times I(2)$$

In the step S113, M(Nb)=M(0) obtained in the step S112 is divided by the output pixel size WD to produce a quotient, the quotient is further converted into an integer value, and the integer value Int{M(0)/WD} is outputted.

In the step S114, the output pixel number Nb is incremented to 1.

If No in the step S115, the process advances to the step S116.

In the step S116, WN is added to the input pixel position Pa.

Since Pa has reached WN×2 in the foregoing step S121, the addition of WN results in WN×3.

In the step S117, M(Nb)=M(1), I(Na)=I(2), Pa=WN×3 and Pb=WF+WD hold, and thus M(1) is set at:

$$(Pa-Pb) \times I(Na) = (WN \times 3 - (WF+WD)) \times I(2)$$

Namely, M(1) is set at the product of the length α3 (=WN×3−(WF+WD)) in FIGS. 13(A) and I(2).

Next, in the step S118, the output pixel size WD is added to the output pixel position Pb. Accordingly, Pb becomes WF+WD×2.

Next, in the step S119, the input pixel number Na is incremented to 3.

After the step S119, the process returns to the step S111 and thereafter the processing is repeated in a similar manner.

Next, the change in Na, Nb, Pa, Pb and M(Nb) in the processing of each step in FIGS. 14 to 16 will be explained by taking the case of FIG. 13(B) as an example.

Figure 13B:
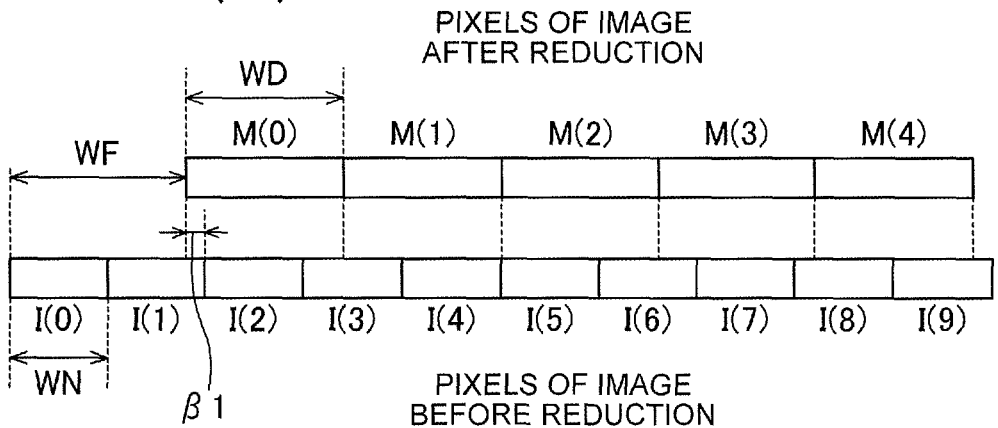

In the case of FIG. 13(B), WN>WF does not hold, and thus the step S101 results in No and the process advances to the step S106.

In the step S106, the input pixel number Na is set at 1 and the output pixel number Nb is set at 0.

In the step S107, the input pixel position Pa is set at WN×2 and the output pixel position Pb is set at the sum of the reduction offset WF and the output pixel size WD.

As the result of this processing, the right end of the pixel I(1) in FIG. 13(B) is set as Pa and the right end (WF+WD) of the pixel M(0) is set as Pb.

In the step S108, the pixel value M(0) of the first output pixel is set at (WN×2−WF)×I(1). Namely, M(0) is set at the product of the pixel value I(1) in FIG. 13(B) and the length of the part β1 (=WN×2−WF) from the left end of the pixel M(0) to the right end of the pixel I(1).

In the step S109, the input pixel number Na is incremented to 2.

After the step S109, the process advances to the step S111. The processing in the step S111 and the subsequent steps is equivalent to that in the case of FIG. 13(A).

However, Na is set at 1 in the step S106 instead of setting Na at 0 in the step S102 and Pa is set at WN×2 in the step S107 instead of setting Pa at WN in the step S103, and thus the values of Na and Pa differ from those in the case of FIG. 13(A) also in the subsequent steps.

In the second embodiment, performing the reduction process by the reference image generation means 2A makes it possible to downsize the image memory 31 in the distortion correction means 3. In other words, if the capacity of the image memory 31 is constant, in the case of dividing the distortion correction target region Atc into the division regions, the size of the division region can be made larger.

In cases where the reduction process is performed, high-frequency components contained in the image decrease due to the reduction process. In other words, high-frequency components of the distortion-corrected division region image D3 generated from the reduced partial region image D23 decreases with increase in the reduction ratio. However, the scaling ratio calculation means 6A calculates the division region scaling ratio MR from the size of the corresponding region Abr in the partial region image D23 after the reduction process (region corresponding to the division region Ab before the reduction process), such as the size of the rectangular region Acr circumscribing the region Abr, and the size of the distortion-corrected division region image D3 outputted by the distortion correction means 3, the pixel gain Gp corresponding to the division region scaling ratio MR is generated, and the adjustment means 8 emphasizes the high-frequency components of each pixel by using the generated pixel gain Gp. Therefor, it becomes possible to lessen the difference in the influence of the reduction process on the image quality between reduction processes with different reduction ratios.

Third Embodiment

While the image processing devices according to the present invention have been described in the first and second embodiments, image processing methods executed by the above-described image processing devices also constitute a part of the present invention.

Further, part or all of the components of the image processing devices described in the first and second embodiments or part or all of processes executed in the aforementioned image processing methods can be implemented by a programmed computer including a processor. Thus, a program for causing a computer to execute part or all of the aforementioned image processing devices or image processing methods and a computer-readable record medium storing such a program also constitute a part of the present invention.

A configuration in a case where the image processing device described in the first embodiment or the image processing method executed by the image processing device is implemented by a programmed computer will be described below.

Figure 18:
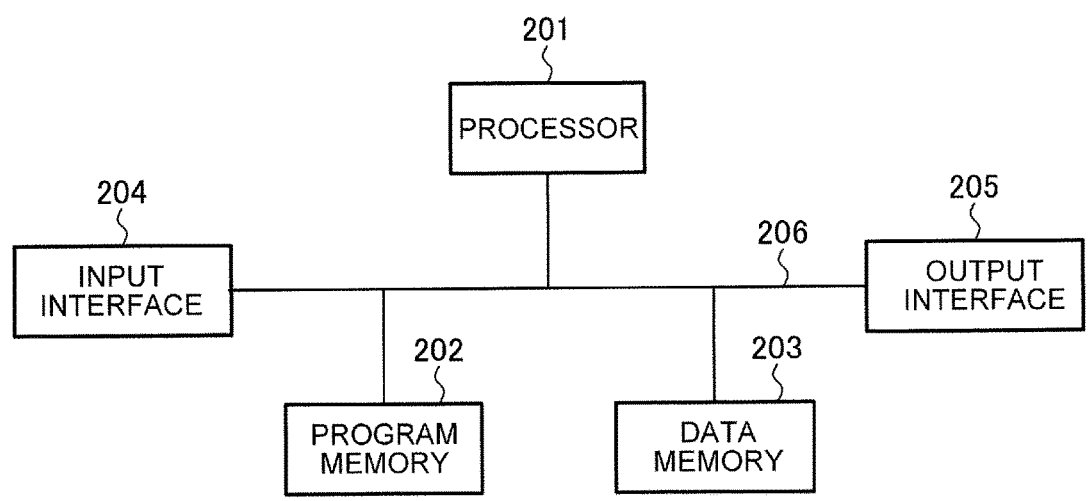
FIG. 18 is a diagram showing a computer usable as an image processing device according to a third embodiment of the present invention.

FIG. 18 shows a computer usable as an image processing device according to a third embodiment, that is, a computer used for executing an image processing method according to the third embodiment. The illustrated computer includes a processor 201, a program memory 202, a data memory 203, an input interface 204, an output interface 205, and a bus 206 connecting these components.

The processor 201 operates for an image inputted via the input interface 204 according to a program stored in the program memory 202. During the course of the operation, various pieces of data are stored in the data memory 203. An image generated as the result of the processing is outputted via the interface 205.

Figure 19:
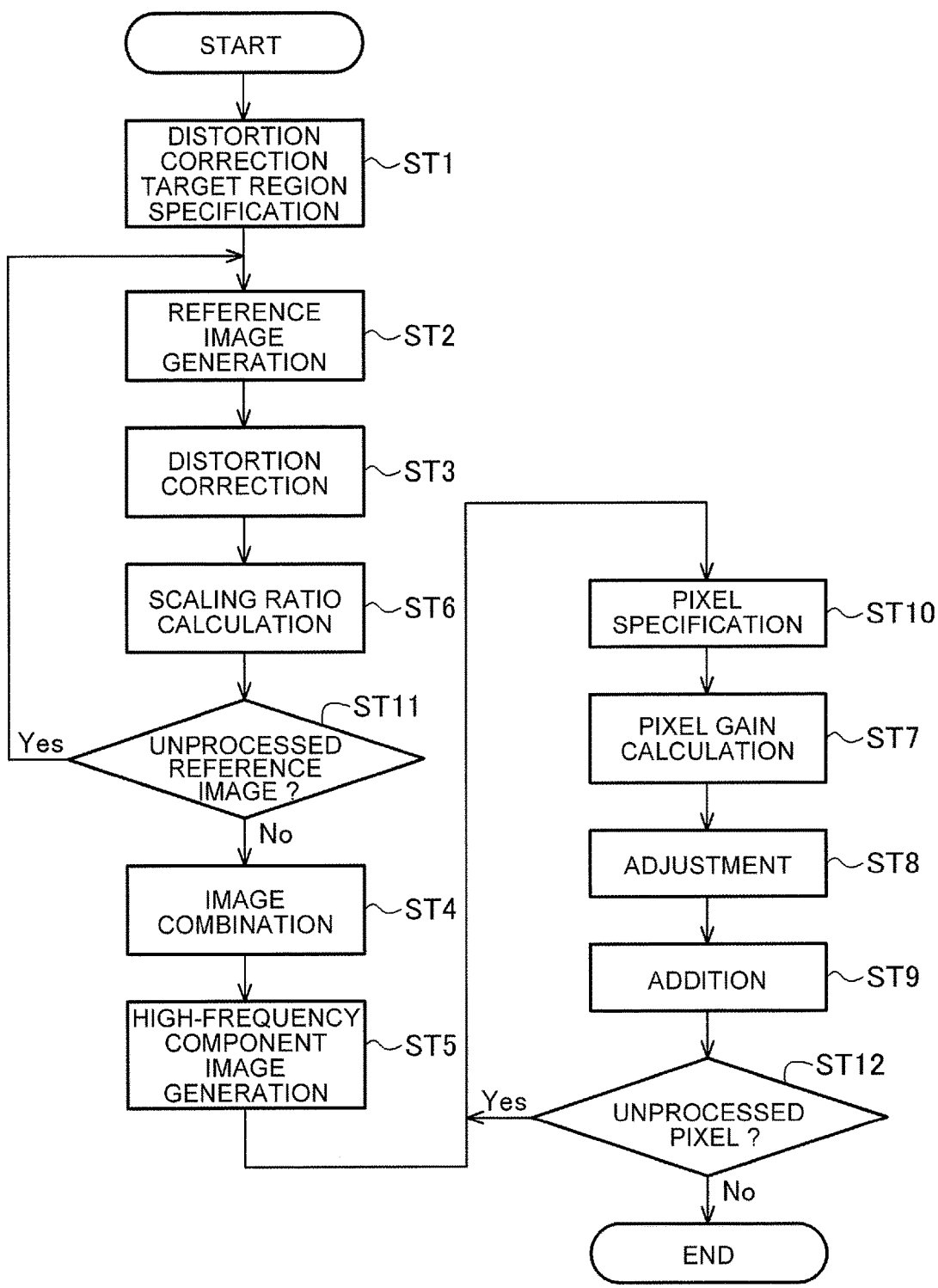
FIG. 19 is a flowchart showing an image processing method executed by the computer of FIG. 18.

FIG. 19 is a diagram showing the flow of the image processing method according to the third embodiment executed by using the image processing device of FIG. 18.

In a distortion-correction-target-region specification step ST1, the information indicating the distortion correction target region Atc in the captured image D103 from the preprocessing unit 103, the information indicating the optical distortion characteristic Chc of the distortion correction target region Atc, and the information indicating the size Sca of the distortion-corrected image D104 are generated. In the distortion-correction-target-region specification step ST1, the information indicating the distortion correction processing mode Sdc is also generated.

The processing of the distortion-correction-target-region specification step ST1 is the same as the processing performed by the distortion-correction-target-region specification means 1 in the description of the first embodiment.

In a reference image generation step ST2, in consideration of the optical distortion characteristic Chc of the distortion correction target region Atc, the size of the reference image before the distortion correction for which the correction process can be performed at a time in a distortion correction step ST3 which will be described below is calculated, and the reference image D2(s, t) is generated from the image of the distortion correction target region Atc and outputted.

Further, in the reference image generation step ST2, the information indicating the distortion correction characteristic Chd of each reference image, specifically, its division region Ab and its vicinal region Ad, is generated from the information indicating the optical distortion characteristic Chc supplied by the distortion-correction-target-region specification step ST1, and the generated information is outputted together with each reference image D2(s, t).

Furthermore, in the reference image generation step ST2, the information indicating the size of the rectangular region circumscribing the division region in the reference image D2(s, t) is generated and outputted.

The processing of the reference image generation step ST2 is the same as the processing performed by the reference image generation means 2 in the description of the first embodiment.

In the distortion correction step ST3, on the basis of the information indicating the distortion correction characteristic Chd of each reference image D2(s, t), specifically, its division region Ab and its vicinal region Ad, generated in the reference image generation step ST2 and the information indicating the distortion correction processing mode Sdc, the distortion correction process for the division region in the reference image D2(s, t) is performed and the distortion-corrected division region image D3(s, t) is generated.

The processing of the distortion correction step ST3 is the same as the processing performed by the distortion correction means 3 in the description of the first embodiment.

In a scaling ratio calculation step ST6, the division region scaling ratio MR(s, t) regarding each distortion-corrected division region image D3(s, t) is calculated from the size of the distortion-corrected division region image D3(s, t) and the size of the division region in the reference image D2(s, t) corresponding to the distortion-corrected division region image D3(s, t).

The processing of the scaling ratio calculation step ST6 is the same as the processing performed by the scaling ratio calculation means 6 in the description of the first embodiment.

In a judgment step ST11, whether the processing has been performed for all the reference images D2(s, t) of the distortion correction target region Atc or not is judged. If there is a reference image D2(s, t) not processed yet, the process returns to the step ST2 and the processing of the steps ST2, ST3 and ST6 is repeated.

In an image combination step ST4, the distortion-corrected image D4 of the distortion correction target region Atc specified in the distortion-correction-target-region specification step ST1 is generated by combining the plurality of distortion-corrected division region images D3(s, t) generated in the distortion correction step ST3.

The processing of the image combination step ST4 is the same as the processing performed by the image combination means 4 in the description of the first embodiment.

In a high-frequency-component image generation step ST5, the high-frequency component image D5 is generated by extracting the high-frequency components contained in the distortion-corrected image D4 generated in the image combination step ST4.

The processing of the high-frequency-component image generation step ST5 is the same as the processing performed by the high-frequency-component image generation means 5 in the description of the first embodiment.

In a pixel specification step ST10, each pixel in the distortion-corrected image D4 is successively specified as the attention pixel and the information D10 indicating the position (p, q) of the specified attention pixel is generated.

The processing of the pixel specification step ST10 is the same as the processing performed by the pixel specification means 10 for specifying the attention pixel in the description of the first embodiment.

In a pixel gain calculation step ST7, the gain (pixel gain) Gp(p, q) regarding the pixel (attention pixel) specified by the information D10 generated in the pixel specification step ST10 is calculated.

This calculation is made on the basis of the division region scaling ratio MR(s, t) of each of the plurality of distortion-corrected division region images D3(s, t) calculated in the scaling ratio calculation step ST6.

The processing of the pixel gain calculation step ST7 is the same as the processing performed by the pixel gain calculation means 7 in the description of the first embodiment.

In an adjustment step ST8, the adjusted high-frequency component image D8 is generated by multiplying the high-frequency component image D5 by the pixel gain Gp.

The processing of the adjustment step ST8 is the same as the processing performed by the adjustment means 8 in the description of the first embodiment.

In an addition step ST9, the distortion-corrected image D4 and the adjusted high-frequency component image D8 are added together and the result of the addition is outputted as the final distortion-corrected image D104.

The processing of the addition step ST9 is the same as the processing performed by the addition means 9 in the description of the first embodiment.

In a judgment step ST12, whether the processing has been performed for all the pixels in the distortion correction target region Atc or not is judged. If there is a pixel not processed yet, the process returns to the step ST10 and the processing of the steps ST10, ST7, ST8 and ST9 is repeated.

If the step ST12 judges that the processing has been performed for all the pixels in the distortion correction target region Atc, the process for the distortion correction target region Atc is ended.

Incidentally, while the processing of the steps ST4 and ST5 is performed after the processing of the steps ST2, ST3 and ST6 is finished for the whole of the distortion correction target region Atc in the above explanation, it is also possible to start the processing of the steps ST4 and ST5 for one or more reference images if the processing of the steps ST2, ST3 and ST6 for the one or more reference images is finished. That is, the processing of the steps ST2, ST3 and ST6 may be performed in parallel with the processing of the steps ST4 and ST5.

While one computer shown in FIG. 18 performs all the processes of the image processing device in the above explanation, it is also possible to provide each unit of the image processing device with one computer and have each computer perform the process of its unit.

In the image processing device of the third embodiment, effects similar to those obtained in the image processing device of the first embodiment can be obtained.

The image processing device of the second embodiment can also be implemented by a programmed computer similarly to that described in the third embodiment.

DESCRIPTION OF REFERENCE CHARACTERS

1: distortion-correction-target-region specification means, 2, 2A: reference image generation means, 3: distortion correction means, 4: image combination means, 5: high-frequency-component image generation means, 6: scaling ratio calculation means, 7: pixel gain calculation means, 8: adjustment means, 9: addition means, 10: pixel specification means, 21: partial-region-image extraction means, 22: characteristic information generation means, 23: image reduction means, 31: image memory, 32: pixel value interpolation means, 33: distortion-correction-parameter output means, 71: division-region-gain calculation means, 72: gain interpolation means, 101: lens, 102: image pickup device, 103: preprocessing unit, 104: distortion correction processing unit, 105: post-processing unit, 106: image signal output terminal

What is claimed is:

1. An image processing device comprising:
a reference image generator that successively extracts a plurality of partial region images, each including a division region constituting a part of a distortion correction target region, from an input image, and successively outputs the plurality of partial region images or a plurality of images obtained by reducing the plurality of partial region images as reference images each including an image of the division region or a reduced division region corresponding to the division region;
a distortion corrector that performs distortion correction on the image of the division region or the reduced division region included in each of the reference images, and successively outputs a plurality of distortion-corrected division region images;
an image combiner that generates a distortion-corrected image of the distortion correction target region by combining the plurality of distortion-corrected division region images;
a high-frequency-component image generator that generates a high-frequency component image of the distortion-corrected image;
a scaling ratio calculator that calculates a division region scaling ratio regarding each of the plurality of distortion-corrected division region images from a size of the distortion-corrected division region image and a size of the division region or the reduced division region in the reference image corresponding to the distortion-corrected division region image;
a pixel specifier that successively specifies a plurality of pixels forming the distortion-corrected image as attention pixels;
a pixel gain calculator that calculates a pixel gain regarding the attention pixel from a first division region scaling ratio regarding a first distortion-corrected division region image including a pixel corresponding to the attention pixel of the distortion-corrected image and second division region scaling ratios regarding one or more distortion-corrected division region images adjoining the first distortion-corrected division region image;
an multiplier that multiplies a pixel value of a pixel of the high-frequency component image corresponding to the attention pixel by the pixel gain of the attention pixel, and thereby outputs a pixel value of a pixel of an adjusted high-frequency component image corresponding to the attention pixel; and
an adder that outputs a result of addition of a pixel value of the attention pixel of the distortion-corrected image and the pixel value of the pixel of the adjusted high-frequency component image corresponding to the attention pixel as a pixel value of a pixel of a final distortion-corrected image of the distortion correction target region corresponding to the attention pixel.

2. The image processing device according to claim 1, wherein each of the division regions is a region formed by dividing the distortion correction target region.

3. The image processing device according to claim 1, wherein each of the plurality of partial region images including the division region is an image of a region including the division region and a region in a vicinity of the division region.

4. The image processing device according to claim 1, wherein the scaling ratio calculator calculates the division region scaling ratio from a size of a rectangular region circumscribing the division region or the reduced division region in the reference image and the size of the distortion-corrected division region image.

5. The image processing device according to claim 4, wherein the scaling ratio calculator calculates the division region scaling ratio regarding each of the plurality of distortion-corrected division region images as a greater value between a ratio of a number of horizontal pixels of the distortion-corrected division region image to a number of horizontal pixels of the rectangular region and a ratio of a number of vertical pixels of the distortion-corrected division region image to a number of vertical pixels of the rectangular region.

6. The image processing device according to claim 1, wherein the pixel gain calculator calculates a division region gain regarding each of the plurality of distortion-corrected division region images based on the division region scaling ratio regarding the distortion-corrected division region image, and calculates the pixel gain of the attention pixel from a first division region gain of the first distortion-corrected division region image including the pixel corresponding to the attention pixel of the distortion-corrected image and second division region gains of the one or more distortion-corrected division region images adjoining the first distortion-corrected division region image.

7. The image processing device according to claim 6, wherein the pixel gain calculator calculates the division region gain regarding each of the plurality of the distortion-corrected division region images as a value increasing with increase in the division region scaling ratio regarding the distortion-corrected division region image.

8. The image processing device according to claim 7, wherein the pixel gain calculator determines the division region gain regarding each of the plurality of distortion-corrected division region images so that a ratio of increase in the division region gain regarding the distortion-corrected division region image to increase in the division region scaling ratio regarding the distortion-corrected division region image decreases with increase in the division region scaling ratio regarding the distortion-corrected division region image.

9. The image processing device according to claim 6, wherein the pixel gain calculator regards the division region gain regarding each of the plurality of distortion-corrected division region images as a gain at a central position of the distortion-corrected division region image and calculates the pixel gain of the attention pixel of the distortion-corrected image using of linear interpolation.

10. The image processing device according to claim 1, wherein the reference image generator includes:

a partial-region-image extractor that successively extracts the plurality of partial region images, each including the division region constituting a part of the distortion correction target region, from the input image; and an image reducer that reduces the plurality of partial region images extracted by the partial-region-image extractor, and wherein the reference image generator outputs images reduced by the image reducer as the reference images each including the image of the reduced division region.

11. An image capturing device comprising:

an image capture that captures an image of a subject, thereby generates a captured image, and outputs the captured image; and the image processing device according to claim 1 that uses the captured image outputted from the image capture unit as the input image.

12. An image processing method comprising:

successively extract a plurality of partial region images, each including a division region constituting a part of a distortion correction target region, from an input image, and successively output the plurality of partial region images or a plurality of images obtained by reducing the plurality of partial region images as reference images each including an image of the division region or a reduced division region corresponding to the division region;

perform distortion correction on the image of the division region or the reduced division region included in each of the reference images, and successively outputting a plurality of distortion-corrected division region images;

generate a distortion-corrected image of the distortion correction target region by combining the plurality of distortion-corrected division region images;

generate a high-frequency component image of the distortion-corrected image;

calculate a division region scaling ratio regarding each of the plurality of distortion-corrected division region images from a size of the distortion-corrected division region image and a size of the division region or the reduced division region in the reference image corresponding to the distortion-corrected division region image;

successively specify a plurality of pixels forming the distortion-corrected image as attention pixels;

calculate a pixel gain regarding the attention pixel from a first division region scaling ratio regarding a first distortion-corrected division region image including a pixel corresponding to the attention pixel of the distortion-corrected image and second division region scaling ratios regarding one or more distortion-corrected division region images adjoining the first distortion-corrected division region image;

multiply a pixel value of a pixel of the high-frequency component image corresponding to the attention pixel by the pixel gain of the attention pixel and thereby outputting a pixel value of a pixel of an adjusted high-frequency component image corresponding to the attention pixel; and output a result of addition of a pixel value of the attention pixel of the distortion-corrected image and the pixel value of the pixel of the adjusted high-frequency component image corresponding to the attention pixel as a pixel value of a pixel of a final distortion-corrected image of the distortion correction target region corresponding to the attention pixel.

13. A non-transitory computer-readable record medium storing a program which when executed by a processor causes the processor to successively extract a plurality of partial region images, each including a division region constituting a part of a distortion correction target region, from an input image, and successively output the plurality of partial region images or a plurality of images obtained by reducing the plurality of partial region images as reference images each including an image of the division region or a reduced division region corresponding to the division region;

perform distortion correction on the image of the division region or the reduced division region included in each of the reference images, and successively outputting a plurality of distortion-corrected division region images;

generate a distortion-corrected image of the distortion correction target region by combining the plurality of distortion-corrected division region images;

generate a high-frequency component image of the distortion-corrected image;

calculate a division region scaling ratio regarding each of the plurality of distortion-corrected division region images from a size of the distortion-corrected division region image and a size of the division region or the reduced division region in the reference image corresponding to the distortion-corrected division region image;

successively specify a plurality of pixels forming the distortion-corrected image as attention pixels;

calculate a pixel gain regarding the attention pixel from a first division region scaling ratio regarding a first distortion-corrected division region image including a pixel corresponding to the attention pixel of the distortion-corrected image and second division region scaling ratios regarding one or more distortion-corrected division region images adjoining the first distortion-corrected division region image;

multiply a pixel value of a pixel of the high-frequency component image corresponding to the attention pixel by the pixel gain of the attention pixel and thereby outputting a pixel value of a pixel of an adjusted high-frequency component image corresponding to the attention pixel; and output a result of addition of a pixel value of the attention pixel of the distortion-corrected image and the pixel value of the pixel of the adjusted high-frequency component image corresponding to the attention pixel as a pixel value of a pixel of a final distortion-corrected image of the distortion correction target region corresponding to the attention pixel.

* * * * *